Dec. 22, 1970    W. F. ROTHERMEL ET AL    3,549,994
AUTOMATIC METHOD AND APPARATUS FOR OBTAINING DIFFERENT DILUTIONS
FROM BLOOD OR THE LIKE SAMPLES AND PROCESSING THE SAME BY
FLUID HANDLING AND ELECTRONICS TO OBTAIN CERTAIN
NONELECTRIC PARAMETERS
Filed April 17, 1967    7 Sheets-Sheet 3
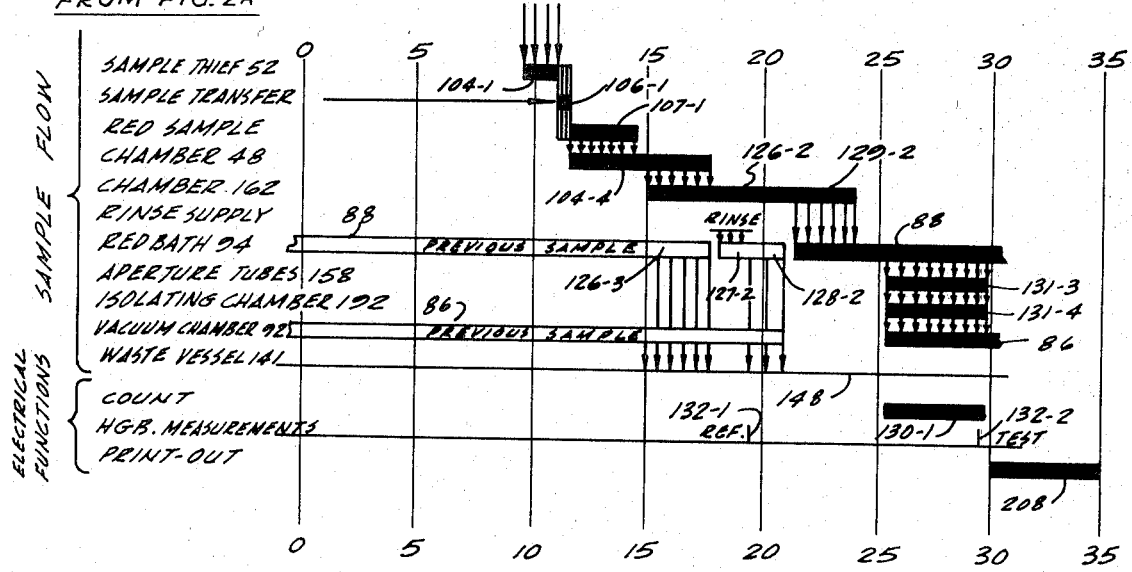
FIG. 2B
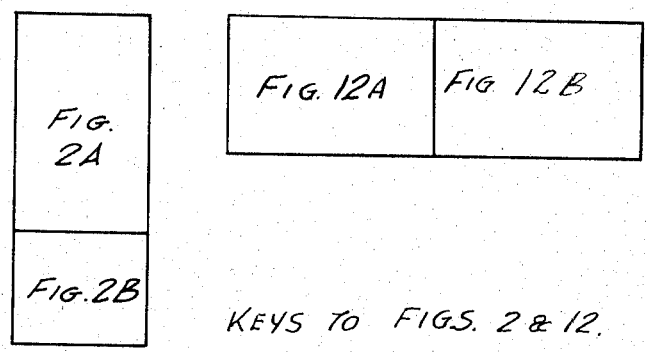
KEYS TO FIGS. 2 & 12.
INVENTORS
WILLIAM F. ROTHERMEL
BY ROBERT I. KLEIN
Silverman & Cass
ATTORNEYS

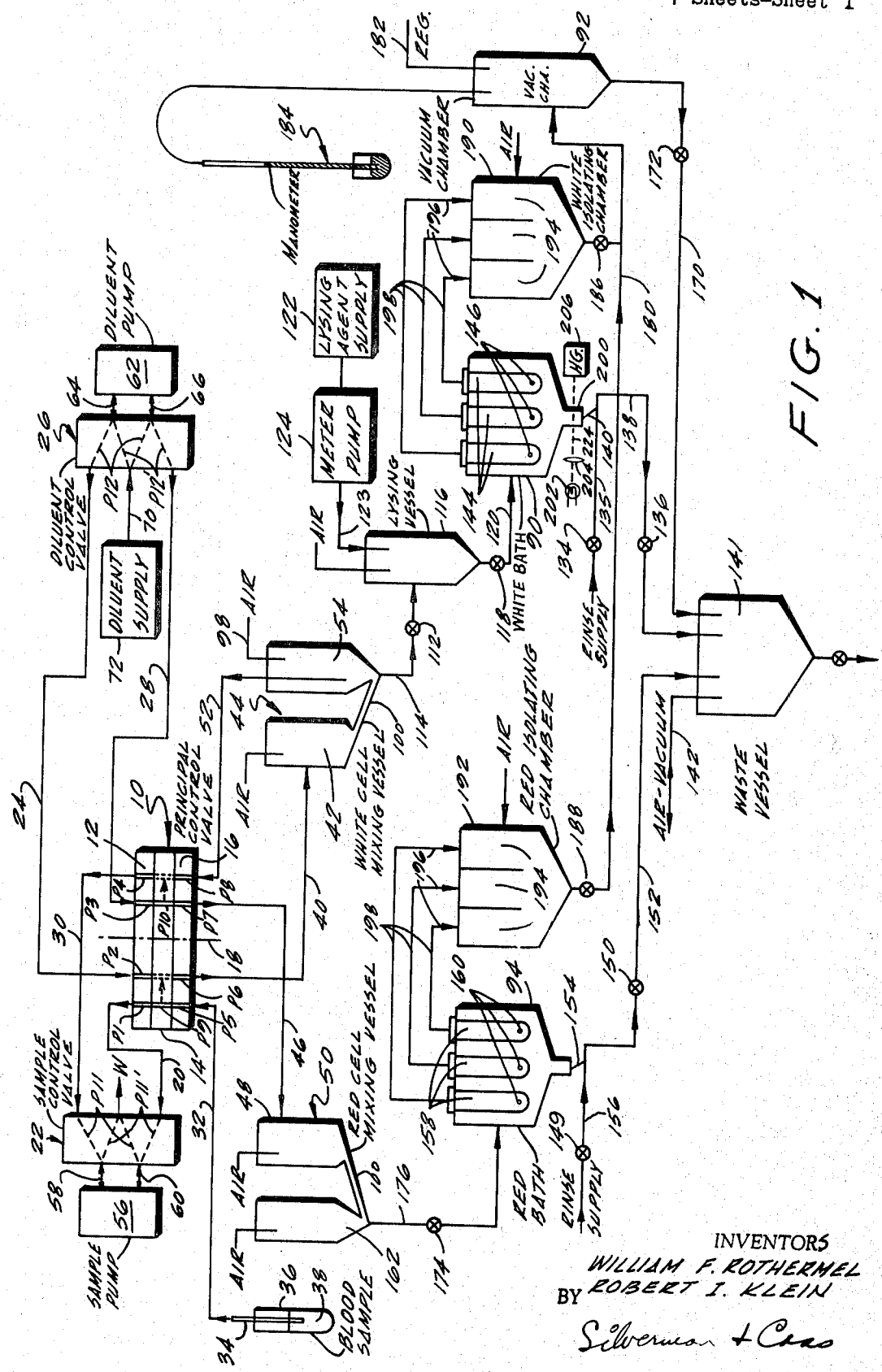

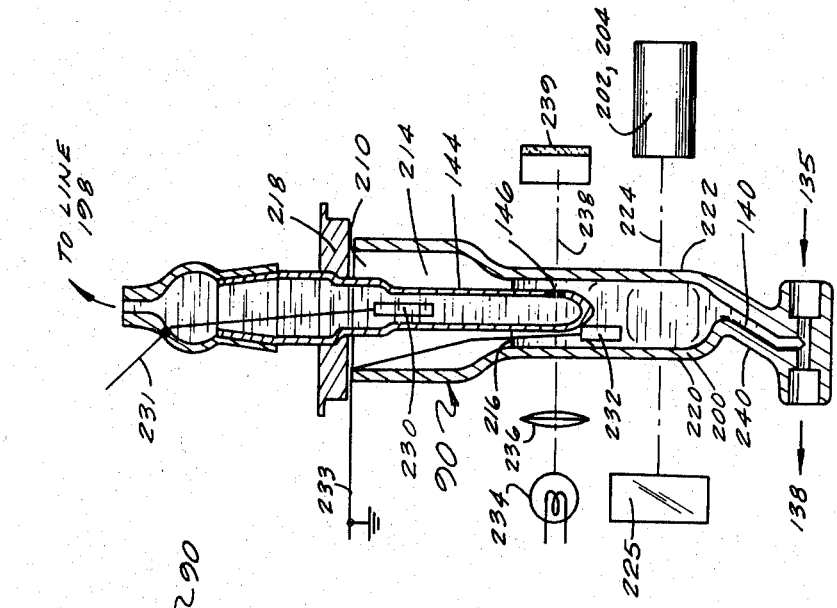
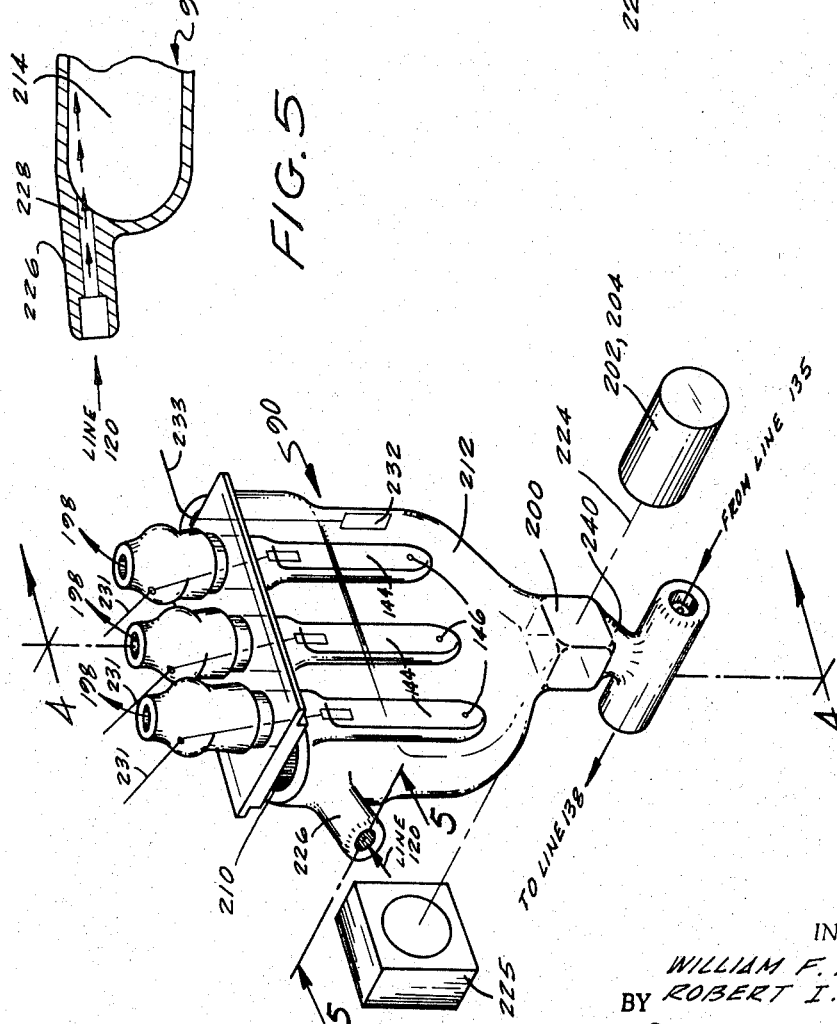

Dec. 22, 1970     W. F. ROTHERMEL ET AL     3,549,994
AUTOMATIC METHOD AND APPARATUS FOR OBTAINING DIFFERENT DILUTIONS
FROM BLOOD OR THE LIKE SAMPLES AND PROCESSING THE SAME BY
FLUID HANDLING AND ELECTRONICS TO OBTAIN CERTAIN
NONELECTRIC PARAMETERS
Filed April 17, 1967     7 Sheets-Sheet 5
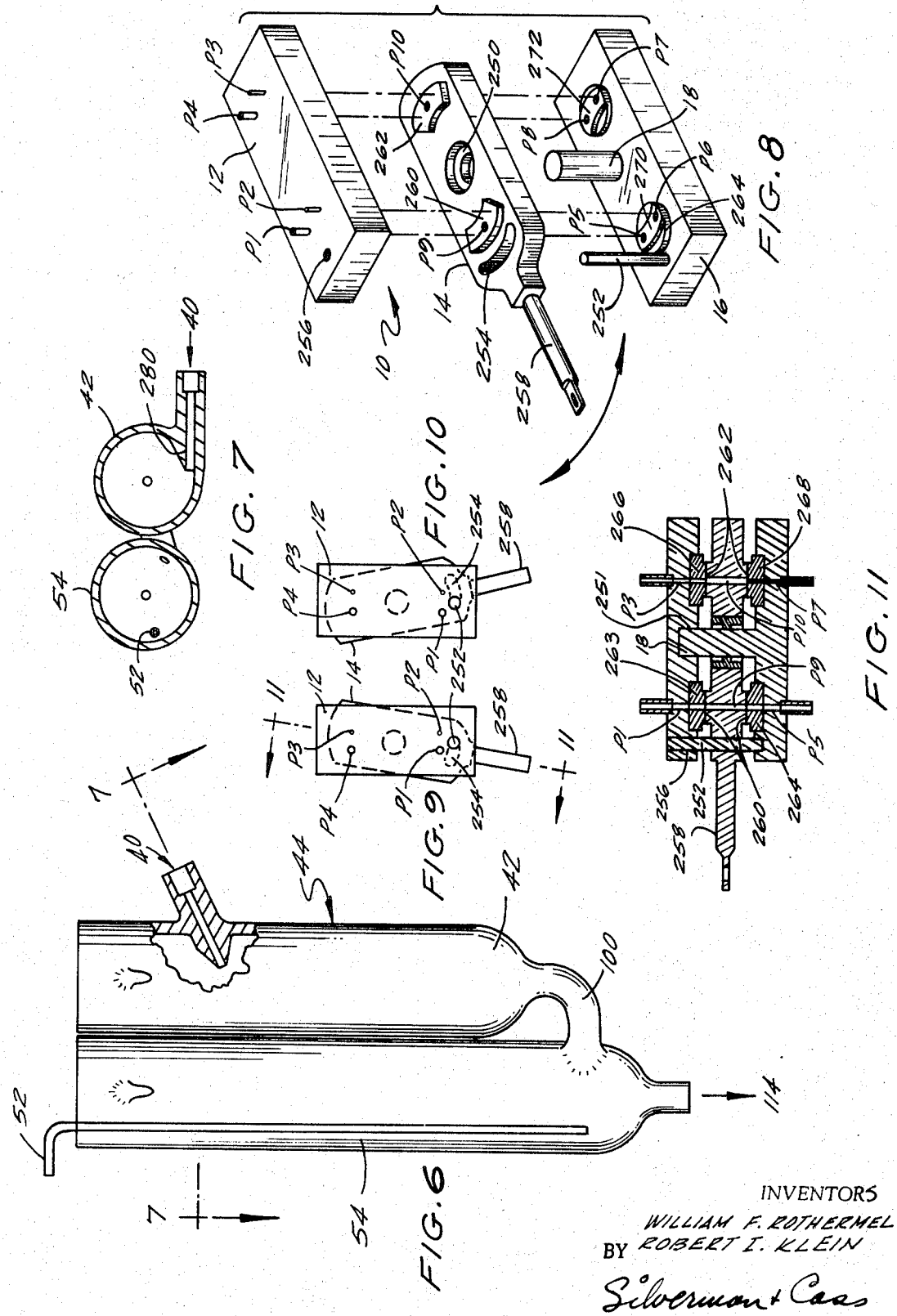
INVENTORS
WILLIAM F. ROTHERMEL
BY ROBERT I. KLEIN
Silverman & Cass
ATTORNEYS

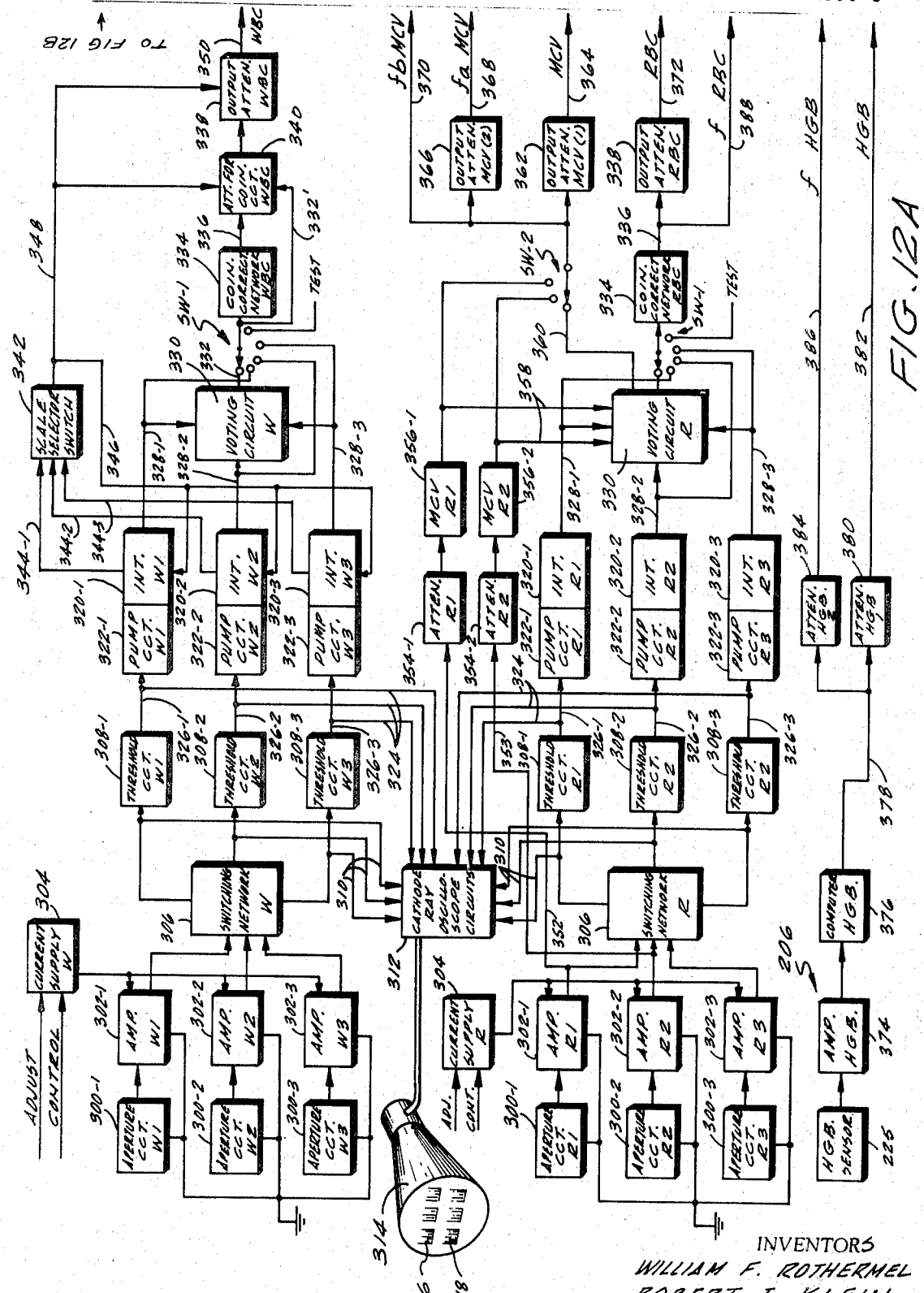

United States Patent Office 3,549,994
Patented Dec. 22, 1970

3,549,994
AUTOMATIC METHOD AND APPARATUS FOR OBTAINING DIFFERENT DILUTIONS FROM BLOOD OR THE LIKE SAMPLES AND PROCESSING THE SAME BY FLUID HANDLING AND ELECTRONICS TO OBTAIN CERTAIN NONELECTRIC PARAMETERS
William F. Rothermel and Robert I. Klein, Hialeah, Fla., assignors to Coulter Electronics, Inc., Hialeah, Fla., a corporation of Illinois
Filed Apr. 17, 1967, Ser. No. 631,284
Int. Cl. G01n 27/00
U.S. Cl. 324—71
41 Claims

ABSTRACT OF THE DISCLOSURE

A structure in which a sample of blood is drawn into a fluid system in which it is accurately diluted with a suitable diluent, divided into two samples for red and white blood cell determinations, the red sample is counted and sized in a multiple aperture Coulter scanning device and discharged, while at the same time that the other sample is lysed to break up the red cells, and subjected to another such Coulter scanning device for a white cell count with the simultaneous examination of the sample for hemoglobin determination and discharged; the processing being carried on automatically and continuously for samples drawn into the apparatus at intervals exceeding at least a certain minimum time. The structure also includes means for combining the data automatically to ascertain certain of the parameters which are susceptible of derivation from determinations made, and producing data corresponding to all of the parameters both determined and derived from the apparatus, these parameters being blood counts, sizes, percentages, and the like, accepted in the medical arts as aids for diagnosis, treatment, and research.

CROSS REFERENCE TO RELATED APPLICATIONS

The method and apparatus of the invention utilizes the teachings of several patent applications to which reference may be had for detailed information concerning the particular structure referred to.

In the preferred form of the apparatus, and in order to achieve reliability while decreasing the time for a sample run, use is made of a multiple aperture arrangement in which there is a plurality of aperture tubes of the Coulter type immersed in a single vessel which is called a bath in the specification which follows. The structure which comprises the multiple aperture arrangement includes fittings which are disclosed and claimed in a copending application entitled "Multiple Aperture Fittings For Particle Analyzing Apparatus," Ser. No. 527,146, filed Feb. 14, 1966 in the names of Wallace H. Coulter and Walter R. Hogg. The scanning means and circuitry for the multiple aperture arrangement, including voting circuits to discard data which are apparently invalid, are disclosed and claimed in a copending application entitled "Particle Analyzing Apparatus and Method Utilizing Multiple Apertures," Ser. No. 509,986, filed Nov. 26, 1965 by the same applicants. For reference in the body of the specification herein, the first of these applications will often be referred to as the "fittings" application, while the second will be referred to as the "electronics" application.

As will be noted in the specification, one of the parameters which is measured by the apparatus is the mean corpuscular volume or MCV, as it is termed. The apparatus utilizes structure which is disclosed and claimed in a third co-pending application entitled "Apparatus and Method for Determining Mean Particle Volume," Ser. No. 441,481, filed Mar. 22, 1965 in the names of Leo B. Bloomfied, Walter R. Hogg, Wallace H. Coulter and Ervin L. Dorman.

All of the above applications are owned by the assignee of the instant application.

An application entitled "Hemoglobinometer" filed on even date herewith and bearing Ser. No. 631,430, in the name of Gerhard A. Liedholz discloses the details of the hemoglobinometer used in this apparatus. This application is also owned by the assignee herein.

BACKGROUND OF THE INVENTION

(A) Field of the invention

The field of the invention generally may be considered apparatus or instrumentation for use in medicine and biology. While it necessarily is concerned with particles and the analysis of suspensions of such particles, the particular apparatus is primarily a diagnostic tool for hematologists, diagnosticians and the like for obtaining information about a blood sample, to be used in diagnosis and treatment. Aside from the examination of suspected samples of blood, the instrument is valuable as a device for routine testing, especially on a continuous basis, of a large number of samples.

As is well-known, blood is composed of microscopic cells suspended in a serum. The predominant ones of the cells are the so-called red blood cells and the lesser ones are the white cells. A study of the properties of blood calls for a study of the cells themselves as well as a study of the whole blood, and for this purpose over a period of time there have been a group of measurements or parameters which have been recognized by workers in the field, as providing information considered characteristic of a given sample for its maximum description. The most important parameters are six in number, all relating to the red blood cells and their contents, size, and so on. These parameters are important in the diagnosis, study, and treatment of anemias. A seventh parameter which is used primarily in diagnosing infection and in general health studies is related to the white blood cells.

The first six parameters are clasically referred to as the red blood cell count (RBC), the hematocrit (HCT), the hemoglobin (HGB), the mean corpuscular volume (MCV), the mean corpuscular hemoglobin (MCH) and the mean corpuscular hemoglobin concentration (MCHC). The seventh parameter is the white blood cell count (WBC).

Quantities or parameters which have been directly measured heretofore have bene the first three, namely RBC, HCT and HGB and the white count, WBC. The other three parameters of the red blood group have in the past been derived or computed from the first three.

In order to appreciate the aspects of the invention, each of the parameters or quantities will be explained briefly below.

(RBC) Red blood cell count.—The accepted quantity corresponding to this parameter is the total number of red blood cells which is found in a cubic millimeter of whole blood. It is expressed in millions, with normal being in the vicinity of 5.5 million. The classic method of counting consisted of making a dilution of the whole blood and running a small quantity of this diluted sample into a counting chamber or hemocytometer. This chamber had a known volume and grid lines, and the technologist laboriously counted the cells through a microscope and extrapolated the derived count by multiplying it by the dilution. The inaccuracy of the information gradually caused the parameter to fall into disfavor, but in recent years, with the advent of the Coulter Counter, which is a particle analyzing device operating electronically, RBC's have become more accurate and more meaningful. The Coulter Counter is described briefly below in the discussion of the prior art.

(HCT) Hematocrit.—The parameter which is represented by this value is the percentage of the volume of the whole blood which is occupied by the red cells. Since the cells are flexible, being formed as disc-shaped sacs having a fluid on their interior, they can be molded to occupy a packed volume by centrifugal manipulation. Usually, the worker places a blood sample in a cylindrical chamber, spins it to cause the cells to pack at one end of the chamber, and then notes the relative amount of cells and serum, the latter being a substantially clear liquid readily visible above the solid red mass representing the packed cells. HCT is the percentage ascertained from this measurement. In the apparatus according to the invention, instead of being a measured quantity, this is a derived or computed parameter, as will be seen.

(HGB) Hemoglobin.—This parameter is defined in the medical field as the number of grams of hemoglobin in 100 cubic centimeters of whole blood. The liquid on the interior of the red blood cell is an iron-containing complex protein compound which gives blood its characteristic red color. The well-known method of ascertaining hemoglobin is to make a suspension of blood, lysing it by a suitable chemical which will break up the sacs forming the walls of the cells, freeing the hemoglobin. The free hemoglobin is then chemically reacted with a reagent carried in the diluent to form the color-producing compound that enables a determination to be made. The color of the resulting solution is ascertained by colorimetric methods, using any of a variety of known apparatus. In the invention, the apparatus for determining the hemoglobin parameter is incorporated into another component in a novel manner, and the method is an automated one.

(MVC) Mean corpuscular volume.—This parameter normally is a derived or computed one, but through the use of apparatus described in application Ser. No. 441,481 mentioned above, the parameter is measured in this system. This apparatus is incorporated into the system as described. This parameter is a measure of the average cell size and it is related to normal average cell size. It is given in cubic microns. One compares the normal cell size with the MCV of a sample to ascertain if the average size is larger or smaller within a few percent. One method of computing MCV from measured quantities, assuming that an apparatus as disclosed in the said application is not available, is by dividing the hematocrit by the red blood count, that is, HCT/RBC.

(MCH) Mean corpuscular hemoglobin.—This parameter is a measure of the amount of hemoglobin contained in each red blood cell regardless of its size. It is an index expressed in micromicrograms. Normal is in the vicinity of 29 micromicrograms. It may be derived or computed by dividing the HGB by the RBC. Division by a normal value yields color index.

(MCHC) Mean corpuscular hemoglobin concentration.—This is a measure of the concentration of hemoglobin in an average cell. For a given MCH, the smaller the cell, the higher the concentration. The value is in percentage, with normal being about 36%. The quantity may be derived or computed by dividing the HGB by the HCT.

(WBC) White blood cell count. —This is the number of white cells per cubic millimeter of whole blood. Since the ratio of red to white cells is over a thousand to one, white blood cell count or WBC is measured in units, or units multiplied by 1,000, with a normal count being about 5,000. In order to make a white count it is necessary to eliminate the effect of the red cells from the sample, and this is done by lysing, as in the case of determining hemoglobin. Since a Coulter Counter is used to count the white cells, and the suspension is required to be passed through a microscopic orifice, it is essential that the lysing be done thoroughly so that the resulting debris from the sacs of the red cells will be in the area of the noise or "hash" to which the detecting circuits for the white cells will not respond.

The three quantities or parameters which are measured may be related to one another as explained above, and these relationships are known as blood indices. The three parameters, MCV, MCH and MCHC are normally computed from the RBC, HCT and HGB to provide information for the hematologist as to whether the cells are large or small and whether their hemoglobin is normal or abnormal. Other important information is provided by these indices.

It is obvious from the discussion above that hematology workers have been making measurements and performing the computations necessary to derive the above parameters for a considerable time. Although the so-called measured parameters have been measured by relatively gross and inaccurate methods for many years, the advent of the Coulter Counter has made accurate electronic counting and sizing of blood cells, as well as other biological particles a routine procedure in hospitals and laboratories throughout the world. Recently the MCV has been obtained by an instrument also available commercially, embodying said application Ser. No. 441,481.

The automatic handling of fluid samples for chemical testing of different types is known, and such apparatus has included means for carrying samples on turn-tables or moving carriers, withdrawing samples consecutively and mixing them with other chemicals, subjecting them to various processes, such as interposing the samples in beams of light to obtain data on transmission of the light, and so on. So far as known, this technique of treating a plurality of samples in a sort of "mass production line" method has not been applied to blood, at least to the automatic degree as contemplated by the invention. The problems in treating whole blood and obtaining the parameters apparently have not been solved in any one apparatus which is capable of continuous automatic operation.

At the outset, it will be seen that the method of supplying the samples to the apparatus of the invention is not disclosed in detail, and indeed, the apparatus contemplates that the advantages of continuous automatic processing of whole blood to ascertain a plurality of parameters relating to consecutive samples is of such stature and degree that the loss of time by requiring manual application of the samples to the device is a minimum. Obviously, a turn-table arrangement can be used which would include structure for presenting the samples one after the other, having the withdrawing nozzle dip into the consecutive samples to draw them into the machine, and so on.

(B) Description of the prior art

The prior art which is known and which relates to the invention comprise generally apparatus and methods for performing the separate functions of the apparatus manually. The Coulter particle analyzing structures which are incorporated in the apparatus are embodiments of U.S. Pat. 2,656,508. They differ from known commercial Coulter Counters especially in the method of introducing the suspension into the vessel in which the scanning takes place and in the means used to achieve the flow of liquid through the apertures, although they are similar in principle.

Apparatus are known of the so-called "automatic chemistry" variety, for handling a plurality of samples, treating them with chemicals, measuring responses, and the like. The nature of these devices is such that the operations and functions performed are more or less aggregations of single functions. The apparatus herein is considered an integrated combination with respect to those functions which are performed and which are believed not obvious in view of the teachings of known "automatic chemistry" devices.

It is known that some of the parameters have ben performed by apparatus which was considered automated, but most of these machines do only one or at most two types of functions, and in all cases utilize completely different structures for accomplishing the same when compared with the apparatus of the invention. No known apparatus uses the Coulter principle in an automatic procedure for ascertaining these parameters.

The problems which existed in the prior apparatus for achieving the parameters which are achieved by the invention relate primarily to the difficulty of performing all of the operations and computations on a continuous routine basis. As stated previously, manual measurement and computation has been known, but no combined apparatus is believed to be known which operates as described to provide the functions as described. It is of significance that from the time that the sample is introduced into the apparatus of the invention, according to one embodiment thereof, until the time that a complete read-out of the information desired is available, a total of only 30 seconds elapses, but in the meantime, after half of the time has elasped, the apparatus is ready to accept and can commence processing another sample, and so on. This means that so long as the samples are continuously fed to the apparatus, it will provide at least seven answers accurately and reliably every fifteen seconds. No laboratory known, with any equipment known, is ever believed to have been able to accomplish this, and certainly not with the degrees of accuracy and reliability which are built into the apparatus.

The apparatus of the invention is made possible because of the nature of the principles of the Coulter method as described in U.S. Pat. 2,656,508, but the very same characteristics gives rise to problems which on their face seem practically insurmountable.

The apparatus for counting and sizing particles which is disclosed in said Pat. 2,656,508 depends upon the relative movement of a suspension of particles and a physical path of very small dimensions, whereby each time that a particle appears in the path and displaces its own volume of the diluent there will be a change in the total impedance of the path. Means are provided to effect the relative movement of suspension and path. Additionally a high density electric current is caused to flow in the same path, and the change of impedance will cause a momentary electric signal each time that a particle passes through the path. Moreover, in addition to a signal occurring with the pasage of each particle, the amplitude of the signal is substantially proportional to the size or volume of the particle.

In this manner it is possible to count and size particles. Many Coulter Counter apparatuses using this principle have been placed in use throughout the world, using different electrical circuits and several different structures for achieving the relative motion of the suspension and path. In a well-known structure, the path is established by means of a microscopic aperture provided in a sapphire wafer that is mounted to the wall of a test tube. The tube is filled with diluent and connected to a siphon-manometer that has a metering section calibrated to suck a predetermined volume of liquid through the aperture from a sample suspension in which the aperture tube is immersed. One electrode in the interior of the aperture tube and another in the sample suspension on the exterior of the tube enable the current source to be coupled to the aperture and likewise provide the terminals for the detecting apparatus, which may take a variety of forms.

Most of the apparatus using the Coulter principle operate on the batch method, that is, each sample is presented to the machine for counting or sizing and the apparatus is reset after each use. A few devices have flow-through arrangements, especially where it is not essential that a count be obtained, but where population density is required. Thus, size studies may be accomplished using multiple channels chosen electronically, operating into multichannel analyzers.

The apparatus of this invention is required to operate continuously on the sample presented to it, and yet since the most important parameters to be achieved are counts, continuous flow-through arrangements are not practical unless there is some way of measuring the volume of sample flowing through the aperture and relating it to the time of scanning and the dilution. Even if this can be done, the problem of contamination of sample to sample must be solved.

The invention contemplates a combination of flow-through and batch operation, in which samples are run into a vessel and operated upon, removed from the vessel, the vessel rinsed, the next sample run in, and so on, all continuously and automatically. At the same time, the determination is made. It is done at a constant flow rate, which is based upon the number of apertures being used, and structure is provided to compensate for conditions where the number of apertures is decreased, as for example by operation of a voting circuit reading the results from the respective apertures.

Since the Coulter particle analyzing apparatus produces its signals at the aperture, where the current density is very high and the particles are passing through also, this aperture or the wafer within which the aperture is formed may be considered a scanner. Such a scanner is used in the invention herein, but is provided in plural quantities. The reason is primarily for reliability and the saving of time, which comprise advantages described in connection with the multiple aperture applications above mentioned. These scanners are effective because of the difference in electrical properties between the particles passing through the aperture and the diluent. In other words, the scanner sees one total impedance with the pure diluent in the aperture, and a different total impedance when there is a particle in the aperture. The scanner cannot distinguish between a single particle and a pair or triplet of particles existing in the aperture simultaneously, and hence, it will still produce a signal, but obviously, the signal will have an amplitude which is proportional to the total amount of particulate matter in the aperture at one time. For particles of widely different sizes, this signal from two coincident particles cannot be differentiated from a signal caused by a single particle, although for a particulate system that is substantially mono-sized, the signal can be recognized by its abnormal amplitude. Nevertheless, since the passage of particles has been studied and results from factors including the aperture size and dilution, a given count obtained can be adjusted to compensate for coincidence.

The above discussion serves two purposes. First it brings out some of the aspects of the apparatus which are to be considered, but secondly it emphasizes why it is difficult to construct apparatus for automatically processing blood samples in which the counting of the cells is to be accomplished by scanners operating on the Coulter principle. If the scanners cannot distinguish between a pair of particles and a single particle except as to amplitude, certainly it cannot distinguish between a cell and a bubble if only a count is being taken. If the bubble is of the approximate volume as the particles being studied, it is impossible to distinguish between it and the particle.

In moving liquids through a system in which there is inter-mixture of liquids, the adding or subtracting of quantities of liquids, the pouring, diluting, introduction and emptying of liquids, bubbles are continuously formed. Such bubbles can be carried into the scanning vessels and will produce false counts invalidating data. Streams splash and overshoot, and these produce difficulties because of loss of liquid with attendant changes in dilution ratios and leakage, giving rise to contamination, presence of undesirable moisture, and so on. Since lysing agents are usually some form of saponin, lathers form in lysed suspensions very easily.

The invention solves these problems through the use of novel glassware and through the novel manner in which the apparatus is built with the liquids handled in a manner to preserve dilution ratios, eliminate or substantially reduce turbulence and bubbles and to provide smooth flow where needed. The apparatus of the invention additionally eliminates the problems which have plagued attempts to automate such apparatus in connection with keeping the interior of the fluid transport systems clean and free from contamination caused by prior samples.

SUMMARY OF THE INVENTION

The principal object of the invention is to provide apparatus for the processing of whole blood to obtain a plurality of the blood parameters known, by measurement and derivation, and accomplishing the functions desired automatically and continuously.

Another important object of the invention is to provide an apparatus of this type in which the samples may be fed to the machine in a lesser time than it requires for a complete sample to be processed, so that two processes are being carried out in different parts of the apparatus simultaneously.

The invention is accomplished by means of an apparatus which has a programming means, fluid circuits and electrical circuits. The programming means operates various of the valves, pumps, and the like through the use of pneumatic cylinders, preferably, although other means could be used. The sample of whole blood is introduced through a suitable conduit into the apparatus through a special swinging valve which subtends a given quantity within its movable part and directs it to other parts of the fluid circuit where it is diluted, lysed, measured and discharged. Various structures for accomplishing the ends of the invention are coordinated and combined to achieve the automatic aspect of the apparatus, and it is believed that novelty rests in some of these structures.

The inventive concept rests in the first instance in the apparatus, and in certain subordinate parts thereof. The fluid circuit and its programming provide an important aspect of the invention. The aperture tube bath and hemoglobin measuring extension are believed to comprise novel multifunction apparatus which is unobvious. The structure of the swing valve is believed novel and patentable. The mixing chambers are believed novel. Other aspects will become obvious as the description of the preferred embodiment is set forth hereinafter.

From the description of the preferred embodiment as considered in the light of the drawings attached, the features and advantages of the invention will readily be understood and appreciated by those skilled in this art. Also, it will become evident that the details of the apparatus are capable of considerable variation. The application of the apparatus to biological fluids other than blood will require some modification, but not necessarily such that a departure from the inventive aspect will result.

While seven parameters are obtained from the apparatus by measurement and computation, the invention is not limited thereto. Research workers may require sizing studies and this is perfectly feasible with the apparatus, since the particles are being scanned to provide signals which may readily be applied to sizing apparatus, such as for example, multichannel analyzers. It is not believed necessary to show the modifications which need be made to accomplish this.

BRIEF DESCRIPTION OF THE DRAWINGS

FIG. 1 is a schematic diagram of the fluid circuit which embodies the invention, with the components thereof shown in somewhat block form.

FIG. 3 is a perspective view of the white cell sample aperture tubes and immersion vessel with diagrammatic representation of the hemoglobin measuring apparatus.

FIG. 4 is a sectional view taken generally on the line 4—4 of FIG. 3 and in the indicated direction.

FIG. 5 is a fragmentary sectional detail of FIG. 3 taken generally in a horizontal plane at 5—5.

FIG. 6 is a side elevational view of a mixing vessel.

FIG. 7 is a sectional view taken along the line 7—7 of FIG. 6 and in the indicated direction.

FIG. 8 is an exploded perspective of the sandwich assembly.

FIGS. 9 and 10 are top plan views showing the two positions of the center plate of the sandwich assembly.

FIG. 11 is a sectional view taken along the line 11—11 of FIG. 9 and in the indicated direction.

DESCRIPTION OF THE PREFERRED EMBODIMENT

Figure 2A:
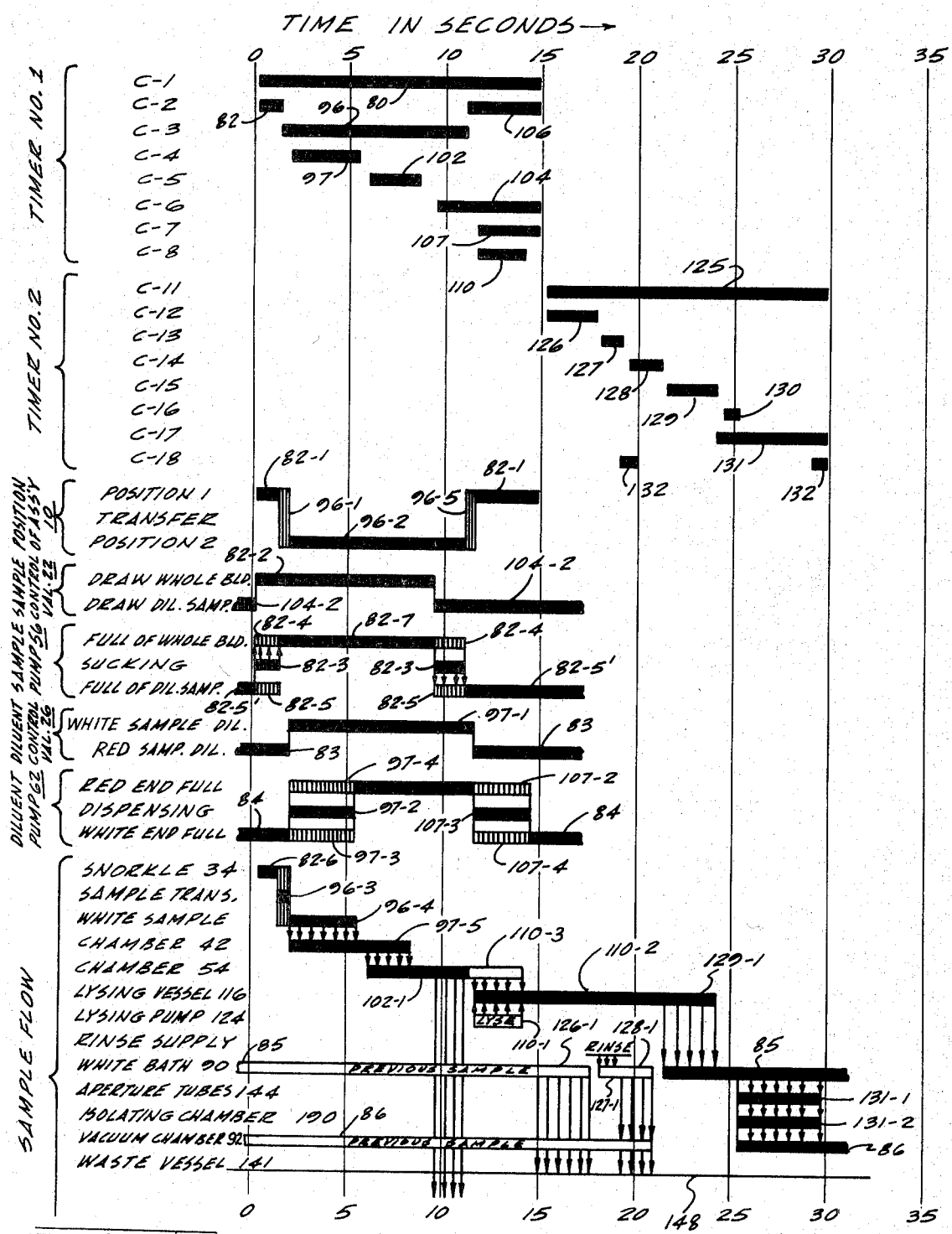
FIG. 2 is a chart which illustrates on the same time scale the programming and timing of functions of the apparatus and the operation of several important parts of the apparatus. This chart is broken into two parts vertically, comprising FIG. 2A and FIG. 2B on different sheets.

At the outset it would be convenient to outline the general scheme of the apparatus by explaining the functions which are performed.

The blood sample is taken in any convenient manner and in whole form is identified by a suitable marking, usually in the form of a card having blanks upon which the desired information will be printed by the printer of the apparatus. The apparatus has a tube or snorkle which is dipped into the sample and draws a quantity into the fluid system. A minute measured part of this whole blood is transferred into a mixing chamber along with a predetermined quantity of diluent where the first dilution occurs. From this chamber a portion of the resulting suspension goes to another mixing chamber along with an injected lysing agent, where the suspension is permitted to remain for a time sufficient to enable the red blood cells to be broken up to release their hemoglobin. From the first mixing chamber a second portion is withdrawn and further diluted in another mixing chamber to provide the red blood sample.

Each of the resulting samples is handled separately after once having been made. The white blood sample containing the hemoglobin is passed into a bath where there are three aperture tubes, and is sucked into all three tubes simultaneously with a constant fluid pressure for a predetermined period of time. The aperture tubes are provided with respective electrodes and there is a common electrode in the bath, so that three sets of signals are obtained by virtue of the passage of the white cells into the aperture tubes. Electronic circuitry provies an output from a detector which represents white blood cell count WMB directly. The white cell sample having the hemoglobin enables the HGB to be made in the aperture tube bath. Accordingly, there is a special extension of the bath providing parallel viewing faces through which a beam of suitable light can be passed through the suspension and into a photo-responsive device to give information concerning the hemoglobin parameter of the original sample. Suitable electronic circuitry connected with the output of the photo-responsive device gives a quantity which represents HGB.

The red blood suspension in the meantime has been passed into a similar bath having aperture tubes, electrodes and electronics to detect the signals resulting from the scanning of the suspension as it passes into the aperture tubes. A similar vacuum system or pump provides constant pressure, and as in the case of the white cell arrangement the scanning occurs for a predetermined length of time representing a flow of a given volume of liquid into all three aperture tubes.

The apparatus has means for filling and emptying the various vessels, as well as for discharging waste comprising excess liquids. Once started, the operations are continuous and the respective samples do not contaminate one another.

The HGB determination, WBC and RBC provide three of the parameters by direct measurement. The MCV is obtained by using two of the outputs from the red blood cell aperture tube counts, to provide reliability. The system provides analog electrical quantities representing these four parameters and stores them in suitable storage circuits.

For computing the remaining three parameters, electronic means are provided. The RBC and MCV are multiplied in a servo operated computing device to give the HCT. The HCT and HGB are divided in a similar arrangement to provide the MCHC. The MCV and MCHC are multiplied in this latter arrangement to give the MCH. The three derived parameters MCHC, MCH and HCT are also stored to be called upon for enabling printing of the data on the sample card.

It will be noted that the HCT in this apparatus is a computed or derived quantity, as opposed to a measured quantity in the past. Likewise, the MCV is a measured quantity here where it was a derived quantity or parameter in the past.

Having explained the general operation and function of the apparatus, the details will be set forth hereinafter in connection with the drawings.

The apparatus is completely programmed by a series of cams which are disposed in proper rotative disposition with respect to one another on shafts driven at a constant speed. The cams are simple switch actuators, with cam surfaces that engage or disengage from the switches which are to be opened or closed in response to movement of the cams. The switches may be electrical, or may be valves, either hydraulic or pneumatic. Since there is nothing in this arrangement per se which is not known, no structure is shown representing the cams, cam-drive or the switches or valves driven thereby. Instead, in FIG. 2, the chart illustrates by means of bars which of the switches will be closed and opened by the cams and for what periods of time.

For example, in FIG. 2, 16 cams are identified, each cam being suitably numbered. One set of cams is numbered from C1 through C8 and the second set of cams is numbered from C11 through C18. Each set of cams is rotated by a separate motor, these being designated on the chart as timer No. 1 and timer No. 2, respectively. The first timer operates cams C1 through C8 over a period of 15 seconds, as shown, and at the end of that time starts timer No. 2, but stops operating itself. It is in condition to be operated again, however, and if started once more by a suitable starting circuit will go through its same cycle again. Also, timer No. 2 will stop after it has operated for fifteen seconds and wait for the next initiating signal to be received from timer No. 1 having completed its cycle.

In this manner, it will appear that although it requires 30 seconds to run a complete sample determination, these runs may be overlapped by as much as fifteen seconds. Obviously a sample determination may be made at intermittent intervals which are greater than fifteen seconds without difficulty.

Looking now at FIG. 1, the diagram illustrates the apparatus in symbols. The control valve for the careful measurement of the whole blood is shown at the top left of the diagram and is designated generally by the reference character 10. It is formed of three elements 12, 14 and 16 with the center element 14 sandwiched between the other two, but swingable in a manner to be described in detail below, to align certain passageways (see FIGS. 8–11).

The sandwiched element 14 is a carefully made and highly accurate structure having a single conduit on opposite sides of a central pivot about which it is adapted to swing. Each of these conduits is designed to carry a precise amount of some fluid, and upon movement between positions, there being two such positions, will slice off or subtend within itself the said quantity of fluid and pass it or transfer it. This function is represented by the arrows showing the alignment of the center conduits with others carried by the sandwiching members of the valve 10. Thus, the upper member 12 and the lower member 16 are fixed relative to one another, and each member has four conduits or passageways. These are designated P1, P2, P3 and P4 in the upper member 12, and P5, P6, P7 and P8 in the lower member 16. When the center part 14 is in one position, say the first, its left hand conduit or passageway P9 is aligned with the passageways P1 and P5 at the same time that its right hand conduit or passageway P10 is aligned with the passageways P3 and P7. If the center part 14 is swung upon the pivot designated symbolically by the broken line 18, to the second position of the said center member 14, the passageways P9 and P10 will move to the positions shown by the broken lines in the direction indicated by the arrows, that is, to the right in FIG. 1, blocking off further flow between the passageways P1 and P5 and between the passageways P3 and P7, while aligning the passageway P9 with the passageways P2 and P6 and aligning the passageway P10 with the passageways P4 and P8.

This action can be reversed, and its effect is to slice a precise volume of fluid out of the one path and enable it to be inserted into the other path while blocking off the first path. This is done at both ends of the valve 10, which, for convenience may be referred to as the sandwich assembly. The movement is reversible.

Fluid lines are connected with the sandwich assembly as follows:

1—Fluid line 20 connects from passageway P1 to the bottom end of the sample control valve 22.
2—Fluid line 24 connects from the passageway P2 to the upper end of the diluent control valve 26.
3—Fluid line 28 connects from the passageway P3 to the lower end of the diluent control valve 26.
4—Fluid line 30 connects from the passageway P4 to the upper end of the sample control valve 22.
5—Fluid line 32 connects from the passageway P5 to the sample snorkle 34. Note that this snorkle is shown dipping into a vessel 36 containing a sample of whole blood at 38, the vessel 36 being any suitable container with some form of identification therewith. As mentioned above, this is preferably in the form of a card or other blank adapted to be inserted into a printing apparatus to have the parameters determined by the apparatus for the particular sample imprinted thereon.
6—Fluid line 40 connects from the passageway P6 to the smaller chamber 42 of the white cell mixing vessel 44.
7—Fluid line 46 connects from the passageway P7 to the smaller chamber 48 of the red cell mixing vessel 50.
8—Fluid line 52 connects from the passageway P8 to the larger chamber 54 of the white cell mixing vessel 44. This line is sometimes called a thief.

Looking for the moment at the fluid flow which is controlled by the structure described, it will be noted that there is a sample pump 56 connected by the lines 58 and 60 to the sample control valve 22, and a diluent pump 62 connected by the lines 64 and 66 to the diluent control valve 26. Both of the control valves 22 and 26 are three-way valves, with the internal alternate paths being shown schematically by slanted dashed lines. The path pairs are P11 and P11' in the valve 22 and the pairs P12 and P12' in the valve 26. In the case of the valve 22, the center paths go to waste designated W, and in the case of the valve 26, the center paths connect with a line 70 extending from a diluent supply 72.

The pumps 56 and 62 are actually manifolds having positive displacement pistons in them, moving from end to end and thereby displacing a volume of fluid. Each pump draws into itself at one end the same volume of fluid it is pushing out at the other end.

If it is assumed that the principal control valve 10 is in the condition shown in FIG. 1 with the center plate 14 disposed so that the solid line portions of the conduits P9 and P10 are on the left aligned with the passageways shown, operation of the sample pump 56 by movement of its piston from bottom to top while the two paths P11' of the valve 22 are in use will enable a sample of whole blood 38 to be drawn into the line 32 and 20 by way of the passageways P1, P9 and P5. At the same time, any liquid which may have been in the upper end of the sample pump 56 is expelled to waste W by way of the line 58. The passageways P11 are blocked off at this time. The whole blood fills the passageway P9 and when the section 14 is swung to its alternate position, represented by the broken line position of the passageway P9, the blood trapped will be aligned with the passageways P2 and P6.

Looking at the bar chart of FIG. 2, the action described above may be traced. The cam C1 is shown closing a switch for the complete period of fifteen seconds at 80. This is a self-energizing or holding function so that the cam drive motor or other means will continue to rotate for this complete time. The bar 82 represents operation of the cam C2 which relates to the performance of several functions. This activating condition affects the fluid system as evidenced by the bars marked 82–1 through 82–6. The bar 82–1 represents the position of the center section 14 of the sandwich assembly 10 and the position designated 1 is that shown by the solid lines of FIG. 1. The position 2 is that represented by the broken lines of FIG. 1. As noted, the sandwich assembly 10 is in position 1 from starting time to the end of bar 82 which is about 1.5 seconds total, considering the initial startup time as zero. Actually there is a fraction of a second before everything commences, as indicated in the bar chart.

The sample control valve 22 is immediately thrown to the condition previously described upon starting up the apparatus, and thus is arranged to suck whole blood into the apparatus. The bar 82–2 indicates this, and it will be noted that just prior to starting up, the valve was in a condition to suck diluted sample, which will be explained below. In this latter condition, the passageways P11' are blocked off and the passageways P11 are connected through the valve. The sample pump 56 sucks the blood as described for the first second and a half as indicated by the solid bar 82–3 transferring up to the lined bar 82–4 indicating that the bottom end of the sample pump is full of whole blood. At the same time, note that the solid bar 82–5', which represented the diluted sample in the upper end of the sample pump 56 from the prior run, changes to lined bar 82–5 which signifies that it is being emptied to waste.

The remainder of the bar chart gives the condition of the fluid system during this same period of time. There are no other switches operated by cams to cause functions, although certain conditions obtain which relate to the operation of the apparatus. The diluent control valve 26 during this first period represented by the bar 82 is in condition that it was when it dispensed diluent to make the red sample. This is shown at 83, and the bar is a continuation of a condition which existed prior to starting the cycle. Accordingly, the bar 84 shows that the diluent pump 62 is full at its upper end with diluent for making the white sample, this having occurred when the red sample diluent was dispensed.

Obviously the dilutions which are performed for red and white cell determinations must be in the order of white first since the concentration must be much greater in view of the lesser number of whites. The red blood sample is made by diluting a prior dilution made for the white cells.

At the same time that this is occurring, and as a matter of fact, for the complete time of the operation of the first timer and the cams C1 to C8, certain parts of the system are full of fluid. Note the open bars 85, 86 (two) and 88 which indicate the presence of previous samples respectively in the aperture tube immersion vessel for the white cell sample shown at 90, designated white bath for convenience; in the vacuum chamber 92; and in the aperture tube immersion vessel for the red cell sample shown at 94, designated red bath for convenience. These samples come into play in the second half of the cycle.

The bar 96 commences at time 1.5 and terminates at about the time 11, meaning that it represents a switch being closed by the cam C3 for a period of 9.5 seconds. The first approximately half second of this condition includes operation of a device such as a relay, cylinder or the like that swings the center plate 14 of the sandwich assembly 10 to its number 2 position. This is represented by the vertical lined bar 96–1. The remainder of the time represented by the bar 96 finds the sandwich assembly 10 always in position 2, as shown at 96–2. Now the whole blood volume which filled the aligned lines 32 and 20 and the passageways through the sandwich assembly 10 in position 1 is broken and blocked off at the break, the small piece or plug of whole blood entrapped in the passageway P9 being moved into alignment with the passageways P2 and P6. During this first half second, since the upper end of the diluent pump 62 was full of diluent from the diluent supply 72 and the valve 26 is arranged to dispense diluent making the white cell sample, the line 24 connecting with the passageway P2 would not permit dispensing diluent through the whole blood sample upon operation of the pump 62, the internal passageways P12' being connected as shown and the passageways P12 being blocked off. As seen at 96–3, the small plug of whole blood is transferred by movement of the center plate 14. The vertical lines indicate such movement down to the bar 96–4 representing the white sample.

Observing the condition of the various other bars, at 97–1 it is seen that as soon as the movement of the center plate 14 has been completed, the valve 26 is thrown to the condition where it will dispense diluent for making the white cell sample, and in this condition, the line 24 does connect with the upper end of the diluent pump with the bottom end connected to the diluent supply. The operation of this valve to change its position is provided by the relay or fluid cylinder that is actuated by the cam C4. Note that the bar 97 between 2 seconds and 5.5 seconds shows actuation of some mechanism to achieve the change of position of the valve 26 to the new position in which it remains until time 11.5 seconds as indicated by the bar 97–1. At the beginning of this period, the dispensing of diluent commences, as indicated by the bar 97–2, the dispensing being completed by the time 5.5 seconds. Since, at the same time that the white sample diluent is being forced out of the pump 62 into the line 24 it is being drawn into the other end of the pump from the supply 72, this eventually becoming the diluent for the red blood cell dilution, the bars 97–3 and 97–4 are lined to show that a transfer is going on. Once the transfer is complete, the pump end which has the red cell diluting fluid remains full until it is called upon to be emptied.

The plug of whole blood as represented by the bar 96–3 and diluent from the line 24 pass through the line 40 into the smaller chamber 42 of the white cell mixing vessel 44 close to the top of the chamber and tangent to the chamber wall. The stream flows without turbulence into the chamber. It will be appreciated that in the line 40 ahead of the plug of blood as well as behind it, from the line 24, there is diluent. Thus, the circular motion of the tangentially entering fluid effects a nonturbulent mixing motion in the horizontal plane. The total amount of diluent which flows into the mixing vessel 44 is the diluent which was displaced from the pump 62. This is 10 cc. and it pushes the plug of blood into the chamber 42, washing out the passageways connected together through the sandwich assembly 10. The plug of whole blood is approximately 50 lambda, its exact volume being sufficient to produce the proper dilution at this point which, when lysed later, will result in a 250 to 1 dilution.

The chambers of the mixing vessel 44 are completely empty when the sample commences to enter, with air entering the chamber 54 at 98, passing through the chamber and the connecting conduit 100 and into the chamber 42. The cam C4 operates the air valves to provide this action, and as will be seen, the action prevents transfer of liquid to the chamber 54 until time 5.5 seconds. Also, this well-regulated air stream, forming relatively large slowly produced bubbles, gives a nonturbulent mixing motion in the vertical plane. The plug of blood is well-mixed with the diluent at this point, being subjected to mixing components of relative movement both in the horizontal and vertical planes as the vessel 42 fills. When all of the solution has run in, there is a short delay, as indicated by the termination of the bar 97 and the cam C5 operates air valves as indicated by the bar 102 for about 2.5 seconds in a reverse direction through the chambers 42 and 54. This causes the sample to be forced into the chamber 54 by way of the conduit 100, again tangent to the wall, so as to eliminate microscope bubbles and turbulence as much as possible. The interval of time between the reversal of the air flow also permits some inertial mixing. As in the case of most fluid transfers in this device, the rate of transfer is decelerated from beginning to end, so that by the time the transfer is complete there is practically zero flow. By suitable adjustment of the valves and actuating means, this can be done to a point where only three or four bubbles in the very last vestiges of transferred fluid assure complete emptying of the chamber, such as the chamber 42.

The transfer from the chamber 42 to the chamber 54 is represented on the bar chart of FIG. 2 by the bar 97–5 being moved downward to the bar 102–1. After complete transfer, the sample remains in the mixing vessel 44 for a period of time which is indicated by the solid bar 102–1 between the times 8.5 seconds and 9.5 seconds, which also causes bubbles to subside.

At 9.5 seconds, the cam C6 operates to provide the bar 104 which continues for a period of about 5.5 seconds to the time 15 seconds. At the beginning of the period, that is, at 9.5 seconds, the sample control valve 22 is shifted to align the internal passageways P11 with the lines 58 and 60, thereby connecting the line 30 with the passageways P4, P10 (the sandwich assembly is in position No. 2), P8 and the line 52 which dips into the sample that is in the chamber 54. The sample pump 56 is now energized and draws about 1 cc. of liquid through its movement, discharging the opposite end of the pump to waste, there having been whole blood in that end. The position remains, and the opposite end, that is, the upper end, is now full of dilute sample which remains in place for the remainder of the operation of the first half of the cycle, and for so much of the second half that a new sample has not been introduced. The bar 82–4 is shown connected with the solid bar 82–7 indicating the presence of whole blood in the bottom end of the positive displacement pump 56 until the transfer commences at the lined portion of the bar, designated 82–4 between times 8.5 seconds and 10 seconds, the condition being the same as at the beginning lined portion 82–4. The transfer of bars from the condition 82–3 to 82–5 comprise a reversal of the conditions at the left hand end of the bar 82–7, so that the condition in the sample pump ends is represented once more by the bar 82–5′.

A small plug of diluted sample (one part whole blood in about 250 parts diluent) is subtended in the passageway P10 in position 2. This transfer of a small sample from the mixing vessel 44 to the sandwich assembly 10 is represented by the vertical lines extending downward from the bar 102–1 to the bar 104–1 (FIG. 2B). At this point in time the cam C2 again closes an actuating device to move the center plate 14 of the sandwich assembly 10 back to position 1. This movement is indicated at 96–5 between time 11 seconds and about 11.5 seconds. The condition of position No. 1 is again indicated at 82–1, the bar representing cam C2 operating being illustrated at 106. When the position No. 1 of the sandwich assembly 10 has been reached, the diluent control valve 26 is operated to move to the position where it is arranged to dispense the red sample diluent. Cam C7 now operates the actuating means for driving the pump 62 as indicated by the bar 107.

During this movement the total amount of diluent within the pump at the lower end (10 cc.) is used to make the red cell dilution and this can be seen by the transfer at 107–1 of the diluent through the line 28, passageways P3, P10 and P7, and the line 46 into the smaller chamber 48 of the red cell mixing vessel 50. The same procedure for mixing goes on here as in the case of the white cell mixture. In passing through the fluid passageways and lines described, the diluent from the control valve 26 pushed the plug of already diluted sample of somewhat greater than 50 lambda volume out of the passageway P10 and rinses that passageway. The movement of this plug is indicated at 106–1, moving downward from the bar 104–1 to the bar 107–1. The condition of the pump 62 now changes from the bar 107–2 indicating the transfer of diluent out of the red cell end of the pump, through the bar 107–3 indicating that there is dispensing, to the lined bar 107–4, indicating that the white cell end of the pump is now full of diluent. This condition obtains along the bar 84 until the next sample is introduced. The condition of the dilution control valve is once more indicated by the bar 83.

At the same time this occurs, namely starting at time 11.5 seconds, which is the end of movement of the plate 14 of the sandwich assembly 10 back to No. 1 position, cam C8 operates during the time of the bar 110. Two functions occur for the time represented, one being the opening of the valve 112 in the drain line 114 to provide a flow of the mixed white cell sample into the lysing vessel 116. The valve 112 was closed up to this time, and the valve 118 in line 120 was open. The second function is the pumping of a metered quantity of lysing agent from the supply 122 through the pump 124 by way of the line 123 into the vessel 116 along with the sample from the vessel 44. The blank bar 110–1 represents the period of pumping lysing agent, the bar being connected by vertical lines pointing toward the bar 110–2 to indicate that the agent is entering the lysing vessel 116. At the same time the sample represented by the solid bar 110–3 is being run into the lysing vessel, which is shown by the vertical lines pointing downward.

In moving these fluids, care is always taken to prevent bubbles. The entrance tubes to the vessels are oriented to direct their contents tangentially against the said walls and the flow is tapered or decelerated. This can be done by suitable control pumps, cylinders and air pressure. In running the liquid into the lysing vessel 116 from the vessel 44, air pressure may be used to assure complete emptying.

It is noted that the condition of the sample control valve 22 is as represented by the bars 104–2, representing movement controlled by the cam C6.

The last function performed by the first timer is indicated at 107–1 in which the red cell sample is being run into the first chamber 48 of the mixing vessel 50 to the position represented by the bar 104–4. The sample remains in that chamber until the time about 18 seconds, which is in the second half of the cycle. The dilution at this time is 50,000 and is a function of the volumetric chambers and passageways of the apparatus.

Now, at the time 15, the second timer is energized by the first timer, its energizing period being controlled thereafter by the cam C11 as represented by the bar 125. The other bars also represent the operation of the various cams, being 126 through 132, for the cams C12 through C18, respectively. Note that the cam C18, which operates the hemoglobin test apparatus has two periods of operation which represents two readings being taken for comparison. This structure is described and claimed in a copending application, filed on even date herewith, in the name of Gerhard A. Liedholz, entitled "Hemoglobinometer" and assigned to the assignee of this application.

At the time 15 seconds, there are no functions noted which are occurring or need occur in the apparatus which are concerned with the drawing in of the whole blood sample, operating the sandwich assembly, moving the sample and dilution pumps; and even the samples are both mixed and ready to be scanned. Accordingly, all of the conditions which obtained in the structures involved are the same as at the beginning of the first half of the cycle, that is, at time zero. This is represented by the bars 82–1, 104–2, 82–5', 83 and 84. This being so, there is no reason why a new sample can't be introduced and the first half cycle started independently of the continuing operation of the second half of the cycle. By suitable disabling circuits, the restarting of the first half of the cycle is rendered inoperative until the cam C11 has energized a suitable circuit, and it is obvious that once the second half of the cycle has started, it will not stop until completed.

The only portion of the apparatus concerned with the second half of the cycle is the structure for running the samples into their respective measuring vessels or baths, taking the measurements, rinsing, draining and so on.

The first function performed is controlled by the cam C12 and the functions are represented by the bars 126–1, 126–2, and 126–3. The first function has to do with the white cell sample aperture tube vessel 90, or white bath as it is called for convenience. The blank bar 85 represents a previous sample which was permitted to remain in the white bath 90. At the time 15 seconds, the valve 134 which is in the line 135 coming from the rinse supply is closed, the valve 136 in the line 138 is opened, and the previous sample is drained from the white bath 90 through a drain conduit 140 which is slanted away from the rinse supply to prevent any back up into the bath. This line 138 leads to a waste vessel 141 controlled by a suitable vacuum line 142. It will be recalled that there was approximately 10 cc. of sample going into the vessel 54 so that the previous sample in the bath 90 was about the same, considering the addition of the lysing agent, the withdrawal for counting, fluid in the lines, etc. The aperture tubes 144, having the apertures 146, are mounted on a movable plate so that they may be handled in unison, and their dimensions are chosen, together with the dimensions of the bath so that considering the volumetric space at the bottom of the bath, 10 cc. of liquid will carry the sample well up past the apertures 146.

After the previous sample has been drained to waste, as indicated by the vertical lines extending downward from the bar 126–1 to the heavy line 148 representing waste, the white bath 90 is empty at the time 17.5 seconds. During this same period, the previous sample in the red bath 94, represented by the blank bar 88, is drained to waste as represented by the bar 126–3 connecting by the lines down to the second waste line 148 at the bottom of the bar chart. The same type of apparatus is involved, comprising the valves 149 and 150, lines 152 and 156 and the slanted drain conduit 154. The red bath 94 is constructed similar to the bath 90 and has the aperture tubes 158 with apertures 160.

The bar 126 also represents the transfer of the red blood sample from the first chamber 48 into the second chamber 162. Thus, the continuation of the bar 104–4 into the second half of the cycle is shown transferring by the vertical lines down to the bar 126–2 at which time the red sample is in the larger chamber 162. It stays in this chamber until it is ready to be transferred to the red bath, which occurs somewhat later in time.

As soon as both of the baths have been emptied to waste, they are rinsed. This is done by closing the valves 136 and 150, opening the valves 134 and 149 and running about 5 cc. of diluent into the bottoms of the respective baths. This rinse does not quite reach past the apertures, and is caused by the operation of cam C13 for the time represented by the bar 127. The left hand ends 127–1 and 127–2 of the bars at the baths indicate the running of the rinse diluent into the baths. The cam C14 controls the second discharge from the baths, during the time 128 as represented by the right hand ends 128–1 and 128–2. It will be noted that the vacuum chamber 92 is connected by the line 170 and the valve 172 to the waste vessel 141, and this chamber 92 is drained at the same time that the both baths are finally emptied. Bar 86 is shown terminating at time 21 seconds, with vertical lines running down to waste 148 for the same period of time as the length of the bar 128.

The next function which occurs is controlled by the cam C15 for the time of the bar 129. In this time the white sample is transferred through the valve 118 and the line 120 to its bath 90 while the red sample is transferred through the valve 174 and the line 176 to its bath 94. The first function is represented by the bar end 129–1 moving down to the solid bar 85, and the bar end 129–2 moving down to the solid bar 88. These two conditions, that is, the baths being filled with samples, will remain until the next samples are ready to be counted.

The white sample by this time consists of microscopic shreds of the outer cell walls of the lysed red blood cells in the vessel 116, the whole white cells and the hemoglobin from the lysed red cells. Considering the size of the passageway P9 and its resulting plug (50 lambda), the 10 cc. of diluent furnished by the diluent pump 62, the prelysing sample withdrawn at 52, the addition of lysing agent at 123, and the movement through the apparatus, the dilution of the white sample entering the white bath is very close to 250 to 1. The red sample run into its bath is 50,000 to 1.

After a short settling period, the counting process starts. This consists of applying a constant vacuum to the line 180 through the means of the vacuum chamber 92. A vacuum regulator connected at 182 is adjusted to a proper value while reading the manometer 184 which, when permitted to withdraw fluid from the baths into the aperture tubes over a given time will provide the proper volumetric sample to be counted. This line 180 connects through the valves 186 and 188, respectively, to isolation chambers 190 and 192, respectively. Each of these chambers has three separate sections 194 with a drip nozzle in each connected to one of the aperture tubes of the associated bath. Thus, sections 194 have drip nozzles 196 connected with lines 198 leading to the respective aperture tubes 144 and 158. Applying a vacuum to the chambers 190 and 192 will suck sample through the apertures 146 and 160 into the interiors of the respective tubes, and as the sample goes through the apertures it may be counted in accordance with the teachings of Pat. 2,656,508 mentioned above. The electrical connections for detecting the passage of particles are not shown in FIG. 1, but are illustrated in other figures. Suffice it to say at this time that each aperture tube has a separate internal electrode and the bath for these tubes has a common or grounding electrode. By dripping the discharge from the lines 198, there is no electrical interference between aperture circuits. Both of the structures for the white and red cells are the same, but it will be noted that there is a rectangular extension 200 at the bottom of the bath 90. (The same vessel may be used for bath 94 for uniformity.) A light source 202, directed through an optical train 204 which will include a green filter to achieve a monochromatic light of proper wave length, passes a beam of light through this extension 200 and impinges upon the photocell of a hemoglobin determining device 206. This is done at time 19.5 seconds by the cam C18 for the time 132 so that a measurement can be made as indicated at 132–1 of the pure diluent being used to rinse the bath 90, and again at time 29.5 seconds at which time the measurement 132–2 is made through the white sample. This data is used to compute the hemoglobin parameter and store it in appropriate circuits to be used in the printer.

The counting operation for both samples proceeds simultaneously as will be obvious from the fluid transfers indicated as occurring out of the baths. The vacuum is applied for a substantially greater length of time than the actual counting occurs, by the operation of the cam C17 and the bar 131. At the time indicated by the right hand end of the bar 85, the white sample is shown being drawn into the aperture tubes, indicated by the bar 131–1, and from there into the isolating chambers indicated by the bar 131–2, and from there into the vacuum chamber 92 where it remains for a period of time as indicated by the bar 86 at the right. As for the red sample, the same thing occurs as indicated by the bars 88 to 131–3 to 131–4 to the bar 86 on the right. The cam C16 starts the count by energizing the circuit momentarily at 130, the circuit remaining in operative counting condition for the length of the bar 130–1.

By the time 30 seconds, all of the data taken has been stored in suitable electronic circuitry. This includes the measured as well as the computed parameters. An automatic printing mechanism is provide, operated by inserting a card to have the data printed thereon. This is indicated by the bar 208, which prints all data in 5 seconds.

Reference may now be had to FIGS. 3, 4 and 5 which illustrate the white cell aperture tubes and their immersion vessel as well as certain symbolic representations illustrating other apparatus. The structure is broadly disclosed in the fittings application above mentioned, and connected electrically in accordance with the multiple aperture electronics application.

Since the white cell sample is lysed, there are not only no red blood cells therein, but in addition, the hemoglobin from the red cells has been released and the same sample is suitable for a hemoglobin determination. This is done by the novel structure which is illustrated. Obviously a chemical in the diluent provides for the treatment of hemoglobin to oxidize it and produce the desired color.

The white bath 90 is preferably a glass jar or pocket open at the top as shown at 210 and narrowing at its bottom end as shown at 212. The chamber 214 formed on the interior thereof is rather narrow, and the aperture tubes 144 which are disposed in the chamber are flattened so that a minimum of sample will rise quite high in the chamber 214. For example, the level is shown at 216 in FIG. 4 above the apertures 146. These aperture tubes are set into a plate 218 by means of which all three of the aperture tubes may be raised or lowered at the same time. This plate is engaged in a large carrier (not shown) which overlies the upper end of the vessel 90.

At its bottom end, the vessel has an integral formation 200 having relatively square cross sectional configuration and which is a hemoglobin measuring extension. The faces 220 and 222 are perfectly parallel and flat and the interior surfaces where the beam of light 224 passes through are also parallel and flat. A light source, projector, filter etc., 202, 204 of standard specifications directs the beam 224 through the same suspension that is being used for achieving the white cell counts and onto a sensor 225 of the hemoglobin determining device 206. The sample is introduced from the line 120 into a spud or nipple 226, the bore 228 of which is tangent to the interior wall of the chamber so that liquid coming in and following the arrows of FIG. 5 will flow in a sliding movement into the chamber without turbulence or bubbles.

When the new sample is in the chamber 214, the aperture tubes 144 being full of a previous sample, application of vacuum causes the new sample to be drawn through the apertures 146 into the interior of the aperture tubes 144. Each tube has its own interior electrode 230 with a conductor 231 leading to a detector (not here shown). A common grounded electrode 232 is disposed in the chamber 214 so that as particles pass through the apertures they will produce signals across the electrodes and across the electric leads 231 and 233 connected to said electrodes for counting, sizing, etc. Each of the three apertures is illuminated by a source of light 234 and some form of collimator or lens 236 is used to confine the beam 238. This beam passes through the aperture, which is usually quite close to one of the side walls, and is then directed upon a mirror 239 from which the aperture appearance may be projected onto a ground glass screen. In this way all three apertures may be viewed optically simultaneously.

The drain for the bath 90 leaves in a fitting 240 whose bore is a slanted conduit 140 mentioned above.

It will be appreciated that the structure described is simple and yet provides for a plurality of functions to be performed simultaneously.

Attention is now invited to FIGS. 8 through 11 which illustrate the sandwich assembly 10. In exploded view, FIG. 8 shows the important parts of the assembly, vertically aligned, which is an intermediate condition occurring in moving between its two positions, heretofore referred to as position No. 1 and position No. 2. The lower plate 16 has at least two posts which engage with the top plate 12 through the center plate 14. The central post 18 is coaxial with the center of rotation of the plate 14, and heretofore this reference numeral has been used to identify such axis. It passes through a precisely fitting bearing 250 positioned in the center plate 14, engaging in a suitable socket 251 in the top plate 12. The post 252 is mounted in the lower plate 16 adjacent one end thereof, and when the plates are assembled, passes through the arcuate slot 254 into a suitable socket provided in the upper plate 12. Preferably, the socket is a vertically aligned hole 256 passing completely through the upper plate so that the upper end of the post 252 will protrude and may be locked in place, if desired. The movement of the center plate is afforded by means of an arm 258 that is linked with a suitable mechanical device programmed by the cam C2. This movement is limited by the slot 254 and in FIGS. 9 and 10 the positions No. 1 and No. 2 respectively are illustrated.

The passageways P9 and P10 are formed by suitable holes drilled in the plate 14, and these are centered as shown, their length being controlled by the thickness of the arcuate projections located respectively at the holes. The projections 260 are on the left at the passageway P9 and the projections 262 are at the right at passageway P10. These projections are carefully ground and lapped for accuracy, and are arcuate to provide the bearing surfaces for the upper and lower plate movement. The passageways P1, P2, P3 and P4 are formed in cylindrical synthetic resin members to provide a degree of resilience enabling fluid tight movement. The resin should be resistant to the liquids used and tough enough to prevent cold flow. Resins having tetrafluorethylene would be suitable, and several are commercially available. The cylindrical member 263 has the passageways P1 and P2 which may include small nipples set into their outer ends to enable flexible hose to be connected thereat. The lower equivalent member is 264 for the passageways P5 and P6. In similar manner there are cylindrical members 266 and 268 for the other pairs of passageways, all passageways having the small nipples protruding from the top and bottom surfaces of the plates 12 and 16 respectively. Each of the cylindrical members has a carefully dimensioned arcuate bearing surface, as for example, those shown in FIG. 8 at 270 and 272, cooperating with respective projections 260 and 262.

In FIG. 9, the No. 1 position has the arm 258 to the left, the post 252 engaging the right hand end of the arcuate slot 254, the passageway P9 aligned with the passageways P1 and P5, and the passageway P10 aligned with the passageways P3 and P7. The other passageways are blocked. In FIG. 10, the No. 2 position has the arm 258 to the right, the passageway P9 now aligned with the passageways P2 and P6, the passageway P10 now aligned with the passageways P4 and P8, and the other passageways blocked.

FIGS. 6 and 7 illustrate a typical mixing vessel, such as for example, the vessel 44 formed with the chambers 42 and 54 connected by the conduit 100. Entry from the line 40 is by way of a nozzle 280 which directs the incoming stream tangentially to the wall to prevent turbulence. The connection between the chambers as shown at 100 is of similar construction. The thief 52 for withdrawing a small sample of diluted blood is shown in chamber 54.

In FIG. 12 the important components of the electrical portion of the system are illustrated, the control, reset and the like connections being omitted for clarity.

There being three aperture tubes for each of the diluted samples, there will accordingly be six aperture circuits, with an amplifier, threshold circuit, integrator, etc., for each aperture. In order to enable the diagram to be followed, all of the components and connections relating to the white blood cell counting circuits are at the top of the diagram and usually identified by the letter W. The red blood cell counting and analyzing circuits are below the white circuits and are designated by the letter R. At the extreme bottom there is illustrated the hemoglobin circuit.

The counting circuits are similar for the red and the white, and hence only the white need be described, with the equivalent components and circuits bearing the same reference characters. The differences will be explained when they are reached in the description. Starting at the upper left, the blocks 300-1, 300-2 and 300-3 represent the white aperture circuits which would include the electrodes previously described, connections, etc. Signals produced in these circuits are the result of each aperture tube having particles pass through its aperture to be scanned. The resulting signals are applied to amplifiers 302-1. 302-2 and 303-3 through which the current source 304 supplies all apertures. In the actual structure, the apertures are approximately 100 microns in diameter, and are carefully matched so that one source of supply suffices for all. Adjustment of current is provided, and each individual channel may be adjusted to give the identical count and signals.

The outputs from the amplifiers 302 are applied to a switching network 306 which normally provides straight-through connections, but which enables cross connections to be made during adjusting periods. The output from each amplifier 302 thus is applied to its own threshold circuit 308-1, 308-2 or 308-3 as the case may be. The amplifier outputs are also applied by the lines 310 along with the outputs from the threshold circuits 324 to the cathode ray oscilloscope circuits 312 so that each aperture circuit may have a pattern on the oscilloscope 314 which gives the condition of its operation. By suitable electronic switching, the three patterns may be seen simultaneously as at 316 and likewise the patterns from the red blood cell aperture circuits may also be seen at 318. The principal outputs from the threshold circuits 308 are applied to the integrators 320-1, 320-2 and 320-3 respectively through pump circuits 322-1, 322-2 and 322-3, each of which normally includes a condenser, electronic switch and diodes of which mention will be made below. The outputs from the threshold circuits 308 to the cathode ray oscilloscope circuits 312 are designated 324 and these indicate the threshold levels of the respective traces on the oscilloscope 314 in a manner which is well known.

It may be useful to digress at this point from the detailed description to discuss the general aspects and requirements of the electrical part of the circuit. Since the apparatus which provides the computations of the parameters not measured are operated as analog computers, it is necessary to convert the pulses which are produced by the aperture circuits 300 into analog quantities. These pulses are voltages at the outputs 326-1, 326-2 and 326-3 provided the aperture pulse was large enough to cross the set threshold level. Each pulse charges a condenser in its respective pump circuit which in turn dumps its charge into the integrator circuit connected with it. The integrator circuit accumulates the charges and provides a stored voltage proportional to the number of charge pulses and can be read at the outputs 328-1, 328-2 and 328-3, respectively. The circuit is arranged so that these outputs can be read off as desired, by means of the switch SW-1 which can be switched from the normal output of the voting circuit 330 to any of the integrator outputs, or to a test position. This allows calibration of the integrator pump capacitors that are adjustable.

The integrator outputs 328 are connected to a voting circuit 330 for the purpose of continuously checking the operation of the aperture circuits 300-1, 300-2 and 300-3 against one another. This structure is fully described in the multiple aperture electronics application above identified. Suffice it to say that if all of the inputs to the voting circuit are about the same value, this means that all apertures are clear and producing signals. If one aperture should clog, the signals from that aperture will be two, and by a process of electronic elimination, the data from the clogged aperture is discarded, and only the data from the other two are used. Voting may result in all data being discarded if all three signals are substantially different. Now the benefits and advantages of using three apertures is that the changes of more than one clogging during a run is remote, but this probability is even further decreased because for any given sample, each aperture is operating only one third of the time that a single aperture would be operating to handle the same volume of suspension. The chances that two out of the three are clogged during a run is even more remote.

The voting circuit 330 normally provides an average value of voltage at its output which is the average of all three inputs, but if one aperture should commence producing a signal that varies from the other two by some factor that is governed by the circuit, it is automatically excluded and the other two are averaged. The voltage level at 332 is attenuated in a coincidence correction network 334 and the total output is attenuated by a factor representing the conversion of the signal at 336 into a voltage representing WBC. The output attenuator 338, adjusts the scale factor for proper printed answers. Attenuator 340 has two states controlled by 348. In one position, the output of the coincidence correction network 336 is passed directly through without change to 338. In the other state a fraction of 336 and 332′ are added to produce a different coincidence correction factor to correspond with a change in the integrator 320-1, 2, 3, scale factor. The purpose of this function is to be explained.

From what has already been said, it is obvious that the number of white blood cells in any given sample is very low compared with the number of red blood cells, also the variation or dynamic range is quite great. Accordingly, for the white blood cell counting circuits, where variation of count is very large, the difference between the values produced by the integrators would be difficult to handle with stability using components generally available. With populations that have many white cells, the voltage that each cell represents at 328, 1, 2, 3, should be smaller than the voltage per pulse with sparse populations. Accordingly, when the integrators and the voting circuits are arranged to produce a given output for a lower range, if the number of white cells turns out to be much greater than some predetermined amount, the circuit may be switched automatically to compensate for this.

This is preferably done by detecting the condition of charge in the integrators 320. Note that there is a connection from all of the integrators to the scale selector switch 342 which applies a voltage from the integrators to a suitable circuit that is normally in a nonconducting condition. For example, a transistor may have all of the leads 344–1, 344–2 and 344–3 connected to its base which is biased not to permit conducting in its collector circuit. Any time that one of the integrators saturates which means that a much larger number of pulses is coming in than the circuit is set up to operate with, conduction occurs and five circuits are rendered conductive. Three of these are controlled by the line 346 and lead back to the integrators, connecting additional condensers in parallel with the integrator condensers to change the scale of the integrators. Two are in the circuits 340 and 338, served by the line 348. One changes the coincidence correction and the other the output attenuation to take into account the scale change.

The output of the attenuator 338 is at 350 and it comprises a D.C. voltage which is proportional to the WBC.

Since the red blood cells do not have as large a count variation as that of white blood cells, its variations can easily be handled by one integrator scale. Accordingly there is no circuitry equivalent to the switch 342 and its associated parts in the red blood cell circuits. In all other respects the red blood cell counting circuit is identical in make-up and the components are identically numbered as the white. The requirements of the red blood circuitry as a rule would be more stringent than the white because sizing is often done on red blood cells. Accordingly amplitudes are desired to be preserved at least up to the point where the sizing information is taken from the original signal channels. In this case since the MCV is being obtained, the sizing information is taken directly out of the amplifiers 302–1 and 302–2. Since there is a voting circuit 330 in the red part of the apparatus, the use of two outputs at 352 and 353 for the MCV determination provides greater reliability in case one of the channels is clogged. These signals are applied to the MCV attenuators 354–1 and 354–2 and from there to the MCV apparatus 356–1 and 356–2. As mentioned above, these devices operate in the manner described in detail in application Serial No. 441,481.

The outputs from the MCV devices are applied by way of the lines 358 to averaging means of a suitable type in the voting circuit 330 so that the output at 360 is an average signal proportional to MCV. By-pass lines connect to terminals of the switch SW–2 which is operated along with the voting circuit to cut out one of the lines 358 and the MCV averaging device in case the voting indicates that one is producing false information. This circuit allows the same voltage factors at 360 to exist when the average of the two MCV signals or either one is used in the case of voting out because of a clogged aperture. Suitably attenuated at 362 a value is produced on the line 364 which is proportional to MCV and which will convert into a proper value for true MCV. Two other outputs are derived from the MCV information, one of which is attenuated by a different amount at 366 to give the voltage at 368 which is a function of MCV identified as $f(a)$MCV, and the other of which is not attenuated and is on the line 370 and identified as $f(b)$MCV.

The RBC of the red blood cell counting circuit is at the line 372 coming out of the attenuator 338 which is the equivalent of the white attenuator 338 with the exception of scale factor switching.

The hemoglobin measuring device 206 is shown at the bottom of FIG. 12. Its sensor 225, shown in FIGS. 3 and 4 provides a current which is amplified in the amplifier 374 and converted in the computer 376 into a voltage at 378 which when suitably attenuated at 380 represents an analog quantity which is the HGB of the sample at 382. This may be converted into digital data. The signal at 378 is attenuated by a different scale in the attenuator 384 to provide a different voltage on the line 386 for use in computing the indices referred to. This value is a function of the HGB and is designated $f$HGB.

Note that the RBC voltage at 336 is used without attenuation in another computation, and by the line 388 is applied to one of the computing devices. This value is a function of RBC and is identified $f$RBC.

Figure 12B:
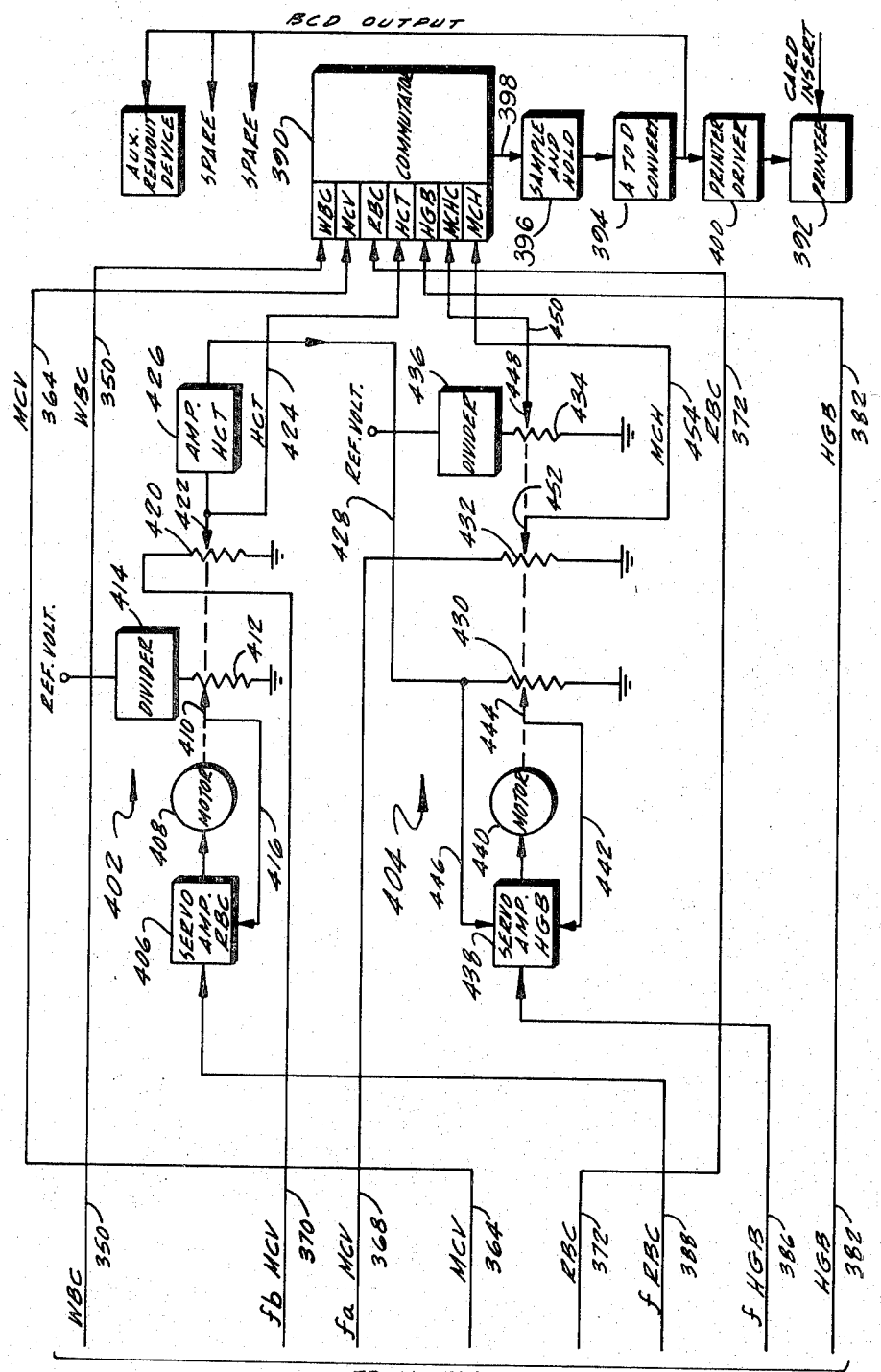
FIG. 12 is a schematic diagram of the principal components of the electrical circuitry of the apparatus. The total diagram is comprised of two parts, 12A and 12B on separate sheets.

For convenience it should be noted at this point that the described circuitry has been carried up to the right hand side of FIG. 12A and the remainder to be described is in FIG. 12B. Also, all of the measured quantities are in the form of D.C. voltages which are stored for the time being in suitable electronic storage means, such as for example, as charges in condensers or as voltages in potentiometers and so on.

The information which has been measured and which will be computed by the apparatus is to be printed upon a card or otherwise transferred to display devices or to recorders. This requires conversion of the analog information to digital information, but for convenience the signals are first handled as analog quantities. In FIG. 12B, the lines 350, 364, 372 and 382 go directly to the distributing apparatus which is referred to as the commutator 390. Each of the seven parameters has a terminal and the commutator 390 scans all the terminals in order, transmitting the information in sequence to the printer 392 after converting it into digital information in the converter 394. The information may be sampled if desired in any suitable device 396 to obtain an indication of the analog quantities on line 398 for other uses if desired. The printer driver 400 enables the card to be advanced after each parameter for a given run is recorded.

The computer 402 provides the HCT and the computer 404 provides the other two indices.

The voltage which is identified as $f$RBC is proportional to RBC and is applied through the line 388 to the servo amplifier 406 which drives the motor 408 rotating the slider 410 on a potentiometer 412 that is adjusted to have a predetermined voltage across it to ground. This voltage is obtained from a suitable reference and adjusted by a divider 414 to the value needed. The position of the slider 410 is thus related to RBC and the feed-back of error voltage through the line 416 keeps the error voltage at zero by suitably rotating the slider. The potentiometer 420 has a voltage across it which is proportional to the MCV because the line 370 is connected at its higher potential end. It will be recalled that the voltage on this line is a function of the MCV identified as $f(a)$MCV. Since the rotation of the slider 410 is ganged to the slider 422, the voltage at 422 is equal to the product of the voltage at the high end on the potentiometer 420 by the rotation or RBC, and this product is directly proportional to HCT. The output therefor is the voltage stored at the point of the slider 422 and appears on the line 424.

The voltage at the slider 422 is amplified at 426 and applied by the line 428 to the top of the potentiometer 430 so the voltage across that potentiometer is proportional to HCT. This is in the computer 404 and it will be noted that there are two other potentiometers 432 and 434. The potentiometer 432 connects with the line 368 so that the voltage $f(a)$MCV on the line makes the voltage across the potentiometer proportional to MCV. The potentiometer 434 has a fixed voltage across it which is determined by the divider 436 and the value of the reference voltage.

In the same manner that the previously described servo amplifier arrangement caused the slider 410 to have its rotational position proportional to RBC, so the servo amplifier 438, motor 440 feed-back line 442, and the connection of the servo amplifier 438 with the line 386 causes the rotational disposition of the slider 444 to be proportional to HGB divided by the HCT or, the MCHC.

This is because instead of a constant voltage across the potentiometer 430 as in the case of the potentiometer 412, the HCT voltage appears across it, and the latter varies. The feedback 446 merely adjusts for constant null width.

To obtain a value of voltage proportional to the position of the slider, 444, the ganged slider 448 picks off a voltage from the potentiometer 434, this voltage appearing at 450 as the MCHC.

The final quantity obtained, namely the MCH is at the slider 452 of the potentiometer 432. Since the position of the slider 452 is proportional to MCHC, being ganged to the other sliders, and since the voltage across the potentiometer 432 is proportional to the MCV, the operation performed is to multiply MCV by MCHC, and the result on the line 454 is the MCH.

The description of the apparatus above is not to be taken as limiting. Various additional components are understood to be included by those skilled in this art, such as mentioned above in the form of means for resetting integrators and the like circuits, timing signal implementing means for starting the apparatus, disabling circuitry to prevent damage to various components and the like. Also, although the computations were performed analog with servo systems, other digital and analog techniques would equally suffice. The hemoglobinometer used is described in the co-pending application of G. A. Liedholz filed on the same date as this application.

Variations are capable of being made without departing from the spirit or scope of the invention.

We claim:

1. Apparatus for ascertaining a plurality of parameters which are characteristic of blood, in an automatic manner, which comprises:
   (A) means for drawing into said apparatus a sample of whole blood,
   (B) a source of diluent,
   (C) a source of lysing agent,
   (D) diluent volume measuring and discharging means,
   (E) blood sample measuring means,
   (F) a first mixing vessel,
   (G) means for making a first dilution out of a predetermined quantity of blood sample and a predetermined quantity of said diluent and storing same in said first mixing vessel,
   (H) means for withdrawing a sample of said first dilution out of said first mixing vessel,
   (I) first dilution sample measuring means,
   (J) a second mixing vessel,
   (K) means for making a second dilution out of a predetermined quantity of first dilution and a second predetermined quantity of said diluent and storing same in said second mixing vessel,
   (L) a first aperture tube immersion bath,
   (M) means for lysing the first dilution and introducing the lysed sample into said first aperture tube immersion bath,
   (N) a first aperture carrying tube in said first bath, the bath and tube having electrodes providing a first independent scanning circuit for obtaining signals from the passage of said sample from the bath into the tube through the aperture of the tube,
   (O) a second aperture tube immersion bath,
   (P) means for introducing the second dilution into said second aperture tube immersion bath,
   (Q) a second aperture carrying tube in said second bath, the bath and tube having electrodes providing a second independent scanning circuit for obtaining signals from the passage of said second dilution from the bath into the tube through the aperture of the tube,
   (R) means for drawing a predetermined volume of dilution into each aperture tube from its respective bath for the electrical scanning of said volume by said scanning circuits during the drawing,
   (S) means for electrically detecting the signals produced by said scanning of the respective lysed sample and second dilution and deriving therefrom a plurality of electrical pulses whose amplitudes are respectively proportional to the sizes of blood cells, said blood cells having been in said lysed sample and second dilution, which produced the same,
   (T) means for deriving a separate electrical accumulated value for the number of pulses produced in the respective detecting means, the value from the lysed sample comprising the WBC and the value from the second dilution comprising the RBC,
   (U) a plurality of fluid lines connecting the various parts of the apparatus to provide paths for continuous movement of all fluids through said apparatus and eventual discharge therefrom, and
   (V) means for programming the operation of said drawing means, measuring and discharging means, dilution-making means and introducing means sequentially in a manner to process said blood sample in the apparatus and including means for operating the electrical detecting means.

2. The apparatus as claimed in claim 1 in which said apparatus has means for enabling the repetitive processing of other samples presented to said apparatus without intersample contamination, comprising, means for continuously storing diluent in certain of said lines between sample processing, means for emptying the storage vessels between determinations, and means for emptying the baths between operations, said programming means including structure for also programming the operation of said vessel and bath emptying means.

3. The apparatus as claimed in claim 2 in which, in addition, means are provided for rinsing the baths with diluent between determinations.

4. Apparatus as claimed in claim 1 in which means are provided to convert said separate accumulated values into analog electrical quantities proportional, respectively, to said WBC and RBC for storage and/or use in computing other parameters electrically.

5. The apparatus as claimed in claim 1 in which a hemoglobinometer including a detector is provided for monitoring the lysed blood sample in said first bath and for producing an analog electrical quantity proportional to the HGB of said blood sample, and said programming means includes structure for programming the operation of said hemoglobinometer.

6. The apparatus as claimed in claim 1 in which means are connected in the detector of said second bath and responsive to said signals produced from passage of the red cells into said second aperture tube for deriving an analog electrical quantity proportional to MCV, said programming means including structure for programming the operation of said MCV measuring means.

7. The apparatus as claimed in claim 1 in which a hemoglobinometer including a detector is provided for monitoring the lysed blood sample in said first bath and for producing an analog electrical quantity proportional to the HGB of said blood sample, there is an MCV measuring device connected with the detector of said second bath and responsive to the signals obtained from passage of red blood cells into said second aperture tube for deriving an analog electrical quantity proportional to MCV, and said programming means includes structure for programming the operation of said hemoglobinometer and MCV measuring device.

8. The apparatus as claimed in claim 7 in which means are provided to convert said separate accumulated values into analog electrical quantities proportional, respectively to said WBC and RBC, computer means are provided for combining the RBC, MCV and HGB to derive analog electrical quantities proportional to HCT, MCH and MCHC.

9. The apparatus as claimed in claim 8 in which said computer means include one structure for multiplying the analog quantities of MCV and RBC to derive an analog quantity proportional to HCT, a second structure for dividing the analog electrical quantity proportional to HGB by said analog electrical quantity proportional to HCT and deriving an analog electrical quantity output proportional to MCHC, and a third structure for multiplying the analog electrical quantity proportional to MCV by the analog electrical quantity proportional to MCHC and deriving an analog electrical quantity output proportional to MCH.

10. The apparatus as claimed in claim 9 in which the second and third computer structures include a servo-amplifier having a rotating member and means to cause the rotational disposition of said rotating member to be proportional to HGB, there being a first potentiometer having a slider connected with said rotating member and having the analog electrical quantity proportional to HCT applied across said first potentiometer with the slider providing the error voltage feedback, a second and third potentiometer each having a slider also ganged to said rotating member, the third potentiometer having a reference voltage across the same so that its slider will pick off said analog electrical quantity proportional to MCHC, the second potentiometer having the analog electrical quantity proportional to MCV connected across the same, and its slider picking off said analog electrical quantity proportional to MCH.

11. The structure as claimed in claim 9 in which means are provided for reading out said analog electrical quantities.

12. The structure as claimed in claim 11 in which said last mentioned means comprise a printer, a scanner for feeding information to said printer, means for connecting the outputs to said information feeding scanner, and means for converting the analog quantities into digital information, said programming means including structure for programming the operation of the read-out means.

13. The apparatus as claimed in claim 1 in which the dilution making means include certain ones of said fluid lines and control valves establishing connection between said diluent volume measuring and discharging means and the said mixing vessels whereby said programming means will operate said control valves to permit said predetermined volumes of diluent to flow through said lines and into the respective mixing vessels but in the order named, and in which said blood sample measuring means and first dilution sample measuring means include sample transfer valve means providing two separate fixed volume passageways and said certain ones of said fluid lines being connected to said transfer valve means, said transfer valve means being operable by said programming means to assume either one of two different conditions, the passageways and fluid lines being connected such that in one condition of operation one fixed volume passageway is interposed in the blood sample drawing means while the second fixed volume passageway is interposed in fluid lines connecting the diluent volume measuring and discharging means with said second mixing vessel so that when diluent flows to said second vessel it will carry the contents of said second fixed volume passageway with such flow leaving the lines and second passageway full of diluent thereafter, in the second condition of operation the one fixed volume passageway is interposed in fluid lines connecting the diluent volume measuring and discharging means with the first mixing vessel so that when diluent flows to the first vessel it will carry the contents of said first fixed volume passageway with such flow leaving the lines and first passageway full of diluent thereafter while the second fixed volume passageway is interposed in the first dilution sample withdrawing means, each of the fixed volume passageways serving to transfer its contents when the transfer valve means is operated to change between conditions.

14. The apparatus as claimed in claim 13 in which said transfer valve means comprises a two position movable member having said fixed volume passageway formed therein, means confining and guiding the movement of the movable member and having ports adapted to align with said passageways at said positions, and said lines being connected with said ports, the movable member having means for driving the same programmed by said programming means, said confining and guiding means having bearing surfaces engaging said movable member over the ends of said passageways during movement to close off said ends between positions.

15. The apparatus as claimed in claim 1 in which there is at least one additional aperture tube in said first bath which, combined with said first tube, provides a first group of aperture tubes; each tube has an electrode and the lysed dilution is drawn into all of the aperture tubes of said first group; each tube provides an independent scanning circuit and has an independent electrical detector; there is at least one additional aperture tube in said second bath which, combined with said second tube, provides a second group of aperture tubes; each tube has an electrode and the second dilution is drawn into all of the aperture tubes of the second group; each tube provides an independent scanning circuit and has an independent electrical detector; the predetermined volume is drawn into the respective groups of tubes, and the outputs from the groups are respectively averaged to obtain said separate accumulated values.

16. Apparatus as claimed in claim 15 in which there is a voting circuit connected with each group of detectors to discard data from any one detector which varies from the others of said group by a predetermined amount.

17. Apparatus as claimed in claim 5 in which the hemoglobinometer includes structure for passing a beam of light of predetermined character through a wall of said bath and through the lysed sample in said bath, and the bath having a transparent portion of its wall providing for such passage.

18. Apparatus as claimed in claim 4 in which means are provided to scale the detecting circuit of said first scanning circuit for different dynamic ranges of white cells in the blood sample, and means are provided for detecting whether the range is high or low and switching to the proper scale.

19. The apparatus of claim 18 in which the detecting circuit is arranged for normally responding to a low concentration, in which the means for converting the pulses to analog quantity comprise an integrator, and in which said detecting circuit comprises means operative when said integrator saturates to effect said switching.

20. Apparatus for ascertaining the physical characteristics of a biological fluid having at least cells of one type suspended therein which comprises:
 (A) sample drawing means having:
  (i) a double acting sample pump having two ports serving as intake and exhaust means for said pump,
  (ii) a first control valve for the double acting sample pump,
 (B) diluent dispensing means having:
  (i) a positive displacement diluent pump having a predetermined displacement volume,
  (ii) conduits connecting said diluent pump with a source of diluent,
  (iii) ports in said pump communicating between the interior of said pump and with said diluent source, and between the interior of said pump and a discharge conduit, and
  (iv) a second control valve for said diluent pump,
 (C) two independent mixing vessels,
 (D) fluid control means for combining the actions of said pumps to provide two separate dilutions of said biological cells, comprising:
  (i) a third control valve having a central member sandwiched between two outer members,
  (ii) means for moving the central sandwiched member relative to the two outer members in a limited movement between two positions, (iii) two passageways in the central member and each having two positions corresponding to the two positions of movement, each passageway having a predetermined length subtended between the outer members, (iv) the outer members having four sets of ports,
(a) a first set adapted to be aligned with the passageway at said first positions and adapted to be blocked at said second position,
(b) a second set adapted to be blocked at said first position but aligned with said first passageway at said second position,
(c) a third set adapted to be aligned with said second passageway at said first position and adapted to be blocked at said second position, and
(d) a fourth set of ports adapted to be aligned with said second passageway at said second position and adapted to be blocked at said first position, (E) fluid conducting means cooperating with said fluid control means comprising:
(i) first fluid lines connecting the first set of ports with said first control valve and sample drawing means, the latter means adapted to be extended to an external sample source,
(ii) second fluid lines connecting the second set of ports between the first mixing vessel and the second control valve,
(iii) third fluid lines connecting the third set of ports between the second mixing vessel and said second control valve, and
(iv) fourth fluid lines connecting the fourth set of ports between said first control valve and said first mixing vessel and including a withdrawing part in said first mixing vessel, (F) programming means and actuating means for said apparatus including structure for driving said pumps and control valves in a predetermined sequence, in which:
(i) when said third control valve is in said first position, a sample of biological suspension is drawn into said first passageway and first fluid lines from said sample drawing means while said diluent pump discharges a predetermined amount of diluent from one part of its interior into said third fluid lines carrying the contents of said second passageway with said predetermined amount of diluent into said second mixing vessel, while at the same time drawing a second of said predetermined amounts into a second part of its interior from said diluent source.
(ii) said third control valve is moved to said second position, capturing a plug of biological sample in said first passageway and moving same into alignment with said second set of ports, and moving the second passageway to be in alignment with said fourth set of ports, and
(iii) when said third control valve is in said second position, said second predetermined volume of diluent is discharged from said diluent pump into said second fluid lines carrying said plug of biological sample with said predetermined volume of diluent into said first mixing vessel, and a portion of the contents of said first mixing vessel is drawn from said withdrawing part into said fourth fluid lines and into said second passageway such that when said third control valve is returned to its first position, a plug of said first dilution will be captured, moved to align with said third set of ports and pass into said second mixing vessel with diluent to provide a substantially greater dilution of said biological sample in said second mixing vessel than in said first mixing vessel.

21. The apparatus of claim 20 in which said biological sample contains at least two different types of particles and in which means are provided to count the particles, comprising:
(A) two aperture carrying tubes each positioned within an immersion bath, means for scanning particles drawn into each tube from its respective bath, and a separate counting circuit connected with each tube and its bath to provide an output representing the number of particles drawn into the respective tubes,
(B) means for separating the types of particles in the first mixing vessel and for introducing the sample of the said first vessel containing only identifiable particles of one type to one bath,
(C) means for introducing the sample from said second vessel into said second bath containing particles of the second type and an insignificant percentage of particles of the first type, due to high dilution, and
(D) said programming means having structure for programming the means for separating the particle types, introducing samples into the respective baths, drawing the samples into the tubes, and operating the separate counting circuits.

22. The apparatus as claimed in claim 21 in which the biological fluid is blood and the particles of the first type are white cells, while the particles of the second type are red cells, and in which the separating means comprise means for lysing the red cells.

23. An apparatus for making a colorimetric measurement and a particle study of the same liquid suspension of particles, which comprises a vessel having transparent walls, an aperture tube disposed in said vessel and having its aperture immersed in a quantity of said suspension contained in said vessel, a portion of said vessel below the normal level of the suspension having a pair of juxtaposed opposite parallel walls for receiving a light beam directed through said parallel walls for said colorimetric measurement, said pair of walls being oriented with respect to said vessel and said aperture tube such that the light beam is caused to pass through said suspension without passing through said aperture tube, the aperture tube and vessel having electrodes therein for scanning the suspension passing through said aperture, means for drawing suspension through said aperture tube, and said electrodes adapted to be connected in circuit with a particle analyzing circuit.

24. The apparatus of claim 23 in which said vessel has a drain at its bottom end and said juxtaposed parallel walls being located directly above said drain.

25. The apparatus of claim 23 in which said vessel is substantially rectangular in plan for accommodating a plurality of aperture tubes therein, and the bottom thereof narrows to a drain, there being a generally rectangular cross-section formation immediately above the drain and said juxtaposed opposite parallel walls being a part of said formation.

26. The apparatus of claim 23 in which there is an entering fitting integral with said vessel adjacent the top thereof to admit the suspension and having the bore arranged to direct the entering stream tangentially of an inner wall of said vessel.

27. The apparatus of claim 23 in which said vessel is in the configuration of a flattened pocket and there are a plurality of such aperture tubes disposed in said pocket and each tube having its own electrode, the tubes are flat to decrease the unoccupied volume of said vessel, and said vessel has a drain in its bottom end with the said parallel walls located above said drain but below said aperture tubes.

28. In apparatus for ascertaining in an automatic manner a plurality of nonelectric parameters of a sample and for obtaining signals from electronic particle analyzing devices relating respectively to the white blood cell count and the red blood cell count of a sample of blood, (A) circuit means for accumulating the signals from one of said particle analyzing devices and converting same to analog quantities, (B) circuit means for accumulating the signals from the other of said particle analyzing devices and converting same into analog quantities, (C) means for applying a particle coincidence correction to each analog quantity, (D) means for scaling the coincidence corrected analog quantity, (E) means for changing the coincidence correction and scale of at least one of said quantities in response to a change of the dynamic range of count detected by said accumulating and converting means, and (F) means responsive to such detection for effecting said change.

29. The apparatus of claim 28 in which each analyzing device has a plurality of scanners and detectors and there is a pulse count for each detector, and in which means are provided for averaging the counts of each device providing all are within a predetermined range of equality counts if they occur and averaging the remainder of counts of said device, if any.

30. The apparatus of claim 28 in which means are provided for measuring MCV from the red blood cell count and converting said MCV into an analog electrical quantity, and a computer is provided for multiplying the RBC and MCV analog quantities to derive an analog electrical quantity proportional to the HCT of said sample of blood.

31. In apparatus for ascertaining in an automatic manner a plurality of nonelectric parameters of a sample and for obtaining signals from a particle analyzing device relating to the red blood count of a sample of blood, (A) circuit means for accumulating said signals and converting same into a first analog quantity, proportional to RBC, (B) means responsive to said signals for measuring the MCV of said count and converting same into a second analog quantity proportional to MCV, and (C) an electrical multiplying circuit connected with said circuit means and said MCV measuring means for multiplying said first and second analog quantities to derive a third analog quantity proportional to the HCT of said blood.

32. The apparatus of claim 31 in which there is a plurality of scanning devices and detectors in said particle analyzing device, each detector is adapted to have its own signals relating to the red blood count of said sample, said circuit means include separate structure for accumulating the signals of each detector and converting same into an analog electrical quantity proportional to the count, and means are provided for averaging the three quantities to obtain an average value proportional to RBC.

33. The apparatus of claim 32 in which there are a plurality of MCV measuring circuits connected with an equal number of said detectors, and means are provided for averaging the output of said MCV circuits.

34. The apparatus of claim 32 in which means are provided for discarding the count from any detector which departs substantially from the average of the others.

35. Apparatus for ascertaining in an automatic manner a plurality of nonelectric parameters of a sample, said apparatus comprising:

a diluting system for providing a plurality of different dilutions for subsequent and discrete analysis, said diluting system comprising:

a valve having a first portion for receiving and isolating a precise amount of the sample and for combining such amount of sample with a predetermined quantity of diluent for making a first dilution, a first vessel for receiving said first dilution, a second portion of said valve coupled to said first vessel for receiving and isolating a precise amount of said first dilution and for combining such dilution with a predetermined quantity of diluent for making a second dilution, and a second vessel for receiving said second dilution, said vessels adapted to be connected to different portions of analysis equipment for ascertaining different of said parameters, such analysis equipment, at least in part, constructed and arranged to determine the non-electric sample parameters by measuring electric properties of said sample dilutions.

36. Apparatus according to claim 35 which further comprises a metered supply of reagent, a third vessel connected to said reagent supply and to said first vessel for receiving and mixing their contents, a first and a second dilution bath coupled to receive said first and second dilutions, respectively, and structure for controlling the flow of dilutions into and out from the baths and for rinsing the baths with diluent between successive receipt of said dilutions.

37. Apparatus according to claim 36 in which:

dilution analyzers are coupled to separately receive said first and second dilutions for the separate determination of at least two of said parameters, and said dilution analyzers comprise scanning structures retained in said baths.

38. Apparatus according to claim 37 in which:

said sample is blood, said reagent is a lysing agent, said first dilution is to be employed for ascertaining a white blood count, said second dilution is for ascertaining a red blood count, and each of said vessels is equipped for mixing its respective contents into suitable dilutions.

39. Method for ascertaining in an automatic manner a plurality of nonelectric parameters of a sample, comprising the steps of:

measuring a small portion of a sample in a first location, passing a metered amount of diluent through that first location while transferring both sample and diluent to a second location, mixing the sample and diluent at the second location and thus forming a first dilution, measuring a small portion of said first dilution in a third location coupled to said first location, passing a metered amount of diluent through said third location while transferring both said portion of the first dilution and the diluent to a fourth location, mixing the contents in the fourth location and thus forming a second dilution, both said measuring steps being accomplished simultaneously and repeatedly for a plurality of samples, a second sample being measured at the same time that said first dilution containing a first sample is being measured, transferring another portion of said first dilution to a fifth location and mixing therewith a reagent, transferring said first dilution from the fifth location to a sixth location for separate and substantially simultaneous electrical and optical analysis for separately ascertaining the values of a first and a second of said parameters, respectively, and transferring said second dilution from the fourth location to a seventh location for electrical analysis for simultaneously ascertaining the values of a third and a fourth of said parameters, both said steps of transferring and the associated ascertaining of said first through fourth parameters being accomplished substantially simultaneously, and said electrical analysis being accomplished by measuring electric properties of said sample dilutions to ascertain the values of said nonelectric parameters.

40. Method according to claim 39 further comprising the steps of:
converting each said parameter value into a corresponding analog electrical quantity,
multiplying together the analog quantities of said third and fourth parameter to obtain an electrical analog quantity of a fifth parameter,
dividing the analog quantity of said second parameter by an analog quantity proportional to said fifth parameter to obtain an electrical analog quantity of a sixth parameter, and
multiplying together the analog quantities of said fourth and sixth parameters to obtain an electrical analog quantity of a seventh parameter.

41. Method according to claim 40 in which:
said sample is blood,
said reagent is a lysing agent,
said analysis is accomplished by electronic particle analyzing,
said parameters are respectively: white blood cell count, hemoglobin, red blood cell count, mean corpuscular volume, hematocrit, mean corpuscular hemoglobin concentration, and mean corpuscular hemoglobin, and further comprising the steps of:
converting said analog quantities to digitally recordable data, and
programming all of said steps in an automatic repeating and interlaced manner.

References Cited

UNITED STATES PATENTS

| | | | |
|---|---|---|---|
| 3,165,693 | 1/1965 | Isreeli et al. | 324—71 |
| 3,340,470 | 9/1967 | Coulter, Jr. | 324—71 |
| 3,361,965 | 1/1968 | Coulter et al. | 324—71 |

E. E. KUBASIEWICZ, Primary Examiner

U.S. Cl. X.R.

23—230; 235—92; 324—140; 356—39